United States Patent
Yaroshchuk et al.

(10) Patent No.: US 11,435,585 B1
(45) Date of Patent: Sep. 6, 2022

(54) ANGULARLY SELECTIVE DIMMING ELEMENT, METHOD OF FABRICATING THE SAME AND OPTICAL DEVICE CONTAINING THE SAME

(71) Applicant: Meta Platforms Technologies, LLC, Menlo Park, CA (US)

(72) Inventors: Oleg Yaroshchuk, Menlo Park, CA (US); Barry David Silverstein, Menlo Park, CA (US); Alireza Moheghi, Menlo Park, CA (US); Gang Li, Menlo Park, CA (US)

(73) Assignee: META PLATFORMS TECHNOLOGIES, LLC, Menlo Park, CA (US)

( * ) Notice: Subject to any disclaimer, the term of this patent is extended or adjusted under 35 U.S.C. 154(b) by 130 days.

(21) Appl. No.: 16/666,918

(22) Filed: Oct. 29, 2019

(51) Int. Cl.
| G02B 27/01 | (2006.01) |
| G03H 1/04 | (2006.01) |
| F21V 8/00 | (2006.01) |
| G02B 27/00 | (2006.01) |
| G03H 1/02 | (2006.01) |
| G02B 27/10 | (2006.01) |

(52) U.S. Cl.
CPC ......... *G02B 27/0172* (2013.01); *G02B 6/005* (2013.01); *G02B 6/0026* (2013.01); *G02B 27/0081* (2013.01); *G02B 27/0179* (2013.01); *G02B 27/1086* (2013.01); *G03H 1/0248* (2013.01); *G03H 1/0465* (2013.01); *G02B 2027/0116* (2013.01); *G02B 2027/0123* (2013.01); *G02B 2027/0174* (2013.01); *G02B 2027/0178* (2013.01); *G02B 2027/0187* (2013.01); *G03H 2223/12* (2013.01); *G03H 2223/23* (2013.01)

(58) Field of Classification Search
CPC ............ G02B 27/0172; G02B 27/1086; G02B 27/0179; G02B 6/0026; G02B 6/005; G02B 27/0081; G02B 2027/0178; G02B 2027/0187; G02B 2027/0116; G02B 2027/0123; G02B 2027/0174; G03H 1/0465; G03H 1/0248; G03H 2223/23; G03H 2223/12
USPC ...................................... 359/13, 15, 630, 34
See application file for complete search history.

(56) References Cited

U.S. PATENT DOCUMENTS

| 5,999,281 A | * | 12/1999 | Abbott | ................... G03B 21/62 156/166 |
| 6,904,200 B2 | * | 6/2005 | Wang | .................... B82Y 20/00 385/37 |
| 9,658,453 B1 | * | 5/2017 | Kress | ................. G02B 27/1086 |

(Continued)

*Primary Examiner* — Audrey Y Chang
(74) *Attorney, Agent, or Firm* — Millburn IP PLLC

(57) ABSTRACT

An optical device having suppressed rainbow effect is provided. The optical device includes a light source configured to generate an image light, an optical combiner coupled with the light source and configured to direct the image light to an eye-box of the optical device, and a dimming element disposed at the optical combiner. The optical combiner includes at least one diffractive element. The optical combiner has a first side facing the eye-box and an opposing second side facing a real world, and the dimming element is disposed at the second side of the optical combiner. The dimming element is configured to receive a light from the real world and significantly attenuate an intensity of the light having an incidence angle in a predetermined range.

8 Claims, 14 Drawing Sheets

(56) References Cited

U.S. PATENT DOCUMENTS

| | | | |
|---|---|---|---|
| 9,679,367 B1* | 6/2017 | Wald | G06T 5/008 |
| 2004/0169930 A1* | 9/2004 | Gilbert | B60R 1/088 |
| | | | 359/604 |
| 2007/0211342 A1* | 9/2007 | Komatsu | G02B 6/005 |
| | | | 359/566 |
| 2008/0297726 A1* | 12/2008 | Rodriguez, Jr. | G02B 13/16 |
| | | | 353/13 |
| 2009/0165943 A1* | 7/2009 | Kim | G02F 1/133524 |
| | | | 156/276 |
| 2012/0188791 A1* | 7/2012 | Voloschenko | G02B 6/0055 |
| | | | 362/606 |
| 2018/0341223 A1* | 11/2018 | Shestak | G03H 1/2294 |

\* cited by examiner

US 11,435,585 B1

ANGULARLY SELECTIVE DIMMING ELEMENT, METHOD OF FABRICATING THE SAME AND OPTICAL DEVICE CONTAINING THE SAME

BACKGROUND

Augmented Reality (AR) and mixed reality (MR) headsets display a virtual image overlapping with real-world images or see-through images. Pupil-expansion waveguide displays with diffractive coupling structures are one of the most promising designs for AR displays and MR displays, potentially offering sun/eye-glasses form factors, a moderately large field of view (FOV), and a large eye-box.

BRIEF SUMMARY OF THE DISCLOSURE

One aspect of the present disclosure provides an optical device having suppressed rainbow effect. The optical device includes a light source configured to generate an image light, an optical combiner coupled with the light source, and a dimming element disposed at the optical combiner. The optical combiner includes at least one diffractive element. The optical combiner is configured to direct the image light to an eye-box of the optical device. The optical combiner has a first side facing the eye-box and an opposing second side facing a real world. The dimming element is disposed at the second side of the optical combiner, and configured to receive a light from the real world and significantly attenuate an intensity of the light having an incidence angle in a predetermined range.

Another aspect of the present disclosure provides an optical device having suppressed rainbow effect. The optical device includes a light source configured to emit a light to illuminate an eye of a user, an optical combiner configured to receive the light reflected by the eye and direct the reflected light towards an optical sensor, and a dimming element disposed at the optical combiner. The optical combiner includes at least one diffractive element. The optical combiner is configured to direct the image light to an eye-box of the optical device. The optical combiner has a first side facing the eye-box and an opposing second side facing a real world. The dimming element is disposed at the second side of the optical combiner, and configured to receive a light from the real world and significantly attenuate an intensity of the light having an incidence angle in a predetermined range.

Other aspects of the present disclosure can be understood by those skilled in the art in light of the description, the claims, and the drawings of the present disclosure.

BRIEF DESCRIPTION OF THE DRAWINGS

The following drawings are provided for illustrative purposes according to various disclosed embodiments and are not intended to limit the scope of the present disclosure.

DETAILED DESCRIPTION

Figure 1A:
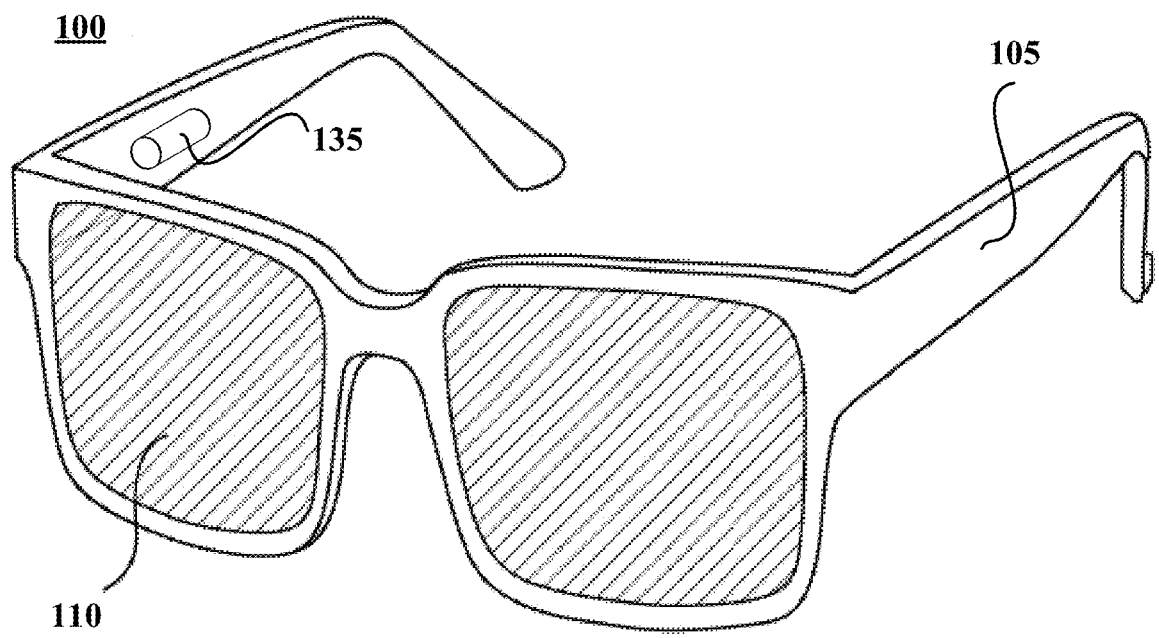
FIG. 1A illustrates a schematic diagram of a near-eye display (NED), according to an embodiment of the present disclosure.

Reference will now be made in detail to exemplary embodiments of the disclosure, which are illustrated in the accompanying drawings. Hereinafter, embodiments consistent with the disclosure will be described with reference to drawings. In the drawings, the shape and size may be exaggerated, distorted, or simplified for clarity. Wherever possible, the same reference numbers will be used throughout the drawings to refer to the same or like parts, and a detailed description thereof may be omitted.

Further, in the present disclosure, the disclosed embodiments and the features of the disclosed embodiments may be combined under conditions without conflicts. It is apparent that the described embodiments are some but not all of the embodiments of the present disclosure. Based on the disclosed embodiments, persons of ordinary skill in the art may derive other embodiments consistent with the present disclosure, all of which are within the scope of the present disclosure.

One of the key challenges of pupil-expansion waveguide displays with diffractive coupling structures are see-through artifacts. Diffractive structures presented in AR headsets, such as a waveguide display, an eye-tracking combiner, may diffract light coming from a real world causing a multicolored glare in the see-through view, especially when a user wearing the AR headset looks at a bright light source from certain angles. Such a see-through artifact is often called "rainbow effect", which significantly degrades the image quality of the see-through view. To suppress the rainbow effect, conventional dimming elements have been used to dim light incident onto the waveguide display at different incidence angles, thereby dimming undesired rainbow. However, the brightness of the desired see-through image may be reduced simultaneously. When the diffractive structure includes a polarization sensitive grating, the incident light may become polarized to dim the undesired rainbow, however, the brightness of the desired see-through image may also be reduced because a polarizing film may transmit only about 40% of the incident light.

Inventors have found that the rainbow effect is mostly resulted from gratings at the waveguide display in an AR headset, especially from a large out-coupling grating that relays light from unintended sources of a real-world environment to eyes of a user. Ray tracing analysis shows that the critical in this sense is the light incident onto the waveguide at a high incidence angle (e.g., larger than 60°), because such an incident light is redirected to the user's eyes by the gratings. A substantially normally incident light onto the waveguide may be diffracted by the gratings only to a high angle that is out of user's sight.

In view of this, the present disclosure provides an optical device having suppressed rainbow effect. The optical device may be implemented into a near-eye display (NED). The optical device may include a light source configured to generate an image light, an optical combiner coupled with the light source, and a dimming element disposed at the optical combiner. The optical combiner may include at least one diffractive element. The optical combiner may be configured to direct the image light to an eye-box of the optical device. The optical combiner may have a first side facing the eye-box and an opposing second side facing a real world. The dimming element may be disposed at the second side of the optical combiner, and configured to receive a light from the real world and significantly attenuate an intensity of the light having an incidence angle in a predetermined range.

The present disclosure also provides an optical device having suppressed rainbow effect. The optical device may be implemented into a near-eye display (NED) for eye-tracking purposes. The optical device may include a light source configured to emit a light to illuminate an eye of a user, an optical combiner configured to receive the light reflected by the eye and direct the reflected light towards an optical sensor, and a dimming element disposed at the optical combiner. The optical combiner may include at least one diffractive element. The optical combiner may be configured to direct the image light to an eye-box of the optical device. The optical combiner may have a first side facing the eye-box and an opposing second side facing a real world. The dimming element may be disposed at the second side of the optical combiner, and configured to receive a light from the real world and significantly attenuate an intensity of the light having an incidence angle in a predetermined range.

In some embodiments, the predetermined range of incidence angle may be from about 60° to 90° and/or −60° and −90°. In some embodiments, the dimming element in accordance with an embodiment of the present discourse may include a plurality of louver structures that enhances an attenuation of the light having the incidence angle in the predetermined range as the incidence angle increases. In some embodiments, the dimming element in accordance with an embodiment of the present discourse may include a holographic dimming element that enhances an attenuation of the light having the incidence angle in the predetermined range via Bragg diffraction. In some embodiments, the holographic dimming element may include a holographic diffuser that enhances the attenuation of the light having the incidence angle in the predetermined range via diffusion resulted from the Bragg diffraction on a randomized reflective grating. In some embodiments, the holographic dimming element may include a reflective volume grating that enhances the attenuation of the light having the incidence angle in the predetermined range via reflection resulted from the Bragg diffraction. In some embodiments, the holographic dimming element may include multiple holograms superimposed to broaden an angular spectrum and/or a wavelength spectrum of the holographic dimming element. In some embodiments, the dimming element in accordance with an embodiment of the present discourse may be a first dimming element, and the optical device may further include a second dimming element configured to attenuate the light from the real world depending on brightness of the real world. The second dimming element may be a tunable dimming element.

FIG. 1A illustrates a schematic diagram of a near-eye display (NED) 100 according to an embodiment of the present disclosure. In some embodiments, the NED 100 may be referred to as a head-mounted display (HMD). The NED 100 may present media to a user. Examples of media presented by the NED 100 include one or more images, video, audio, or some combination thereof. In some embodiments, audio is presented via an external device (e.g., speakers and/or headphones) that receives audio information from the NED 100, a console (not shown), or both, and presents audio data based on the audio information. The NED 100 acts as a virtual reality (VR) device, an augmented reality (AR) device or a mixed reality (MR) device, or some combination thereof. In some embodiments, when the NED 100 acts as an AR or a MR device, portions of the NED 100 and its internal components may be at least partially transparent.

As shown in FIG. 1A, the NED 100 may include a frame 105 and a display 110. Certain device(s) may be omitted, and other devices or components may also be included. The frame 110 may include any appropriate type of mounting structure to ensure the display 110 to be viewed as a near-eye display (NED) by a user. The frame 105 may be coupled to one or more optical elements which together display media to users. In some embodiments, the frame 105 may represent a frame of eye-wear glasses. The display 110 is configured for users to see the content presented by the NED 100. As discussed below in conjunction with FIG. 1B, the display 110 may include at least one display assembly (not shown) for directing image light to an eye of the user. In some embodiments, the at least one display assembly may be a projection system. For illustrative purposes, FIG. 1A shows the projection system may include a projector 135 that is coupled to the frame 105.

Figure 1B:
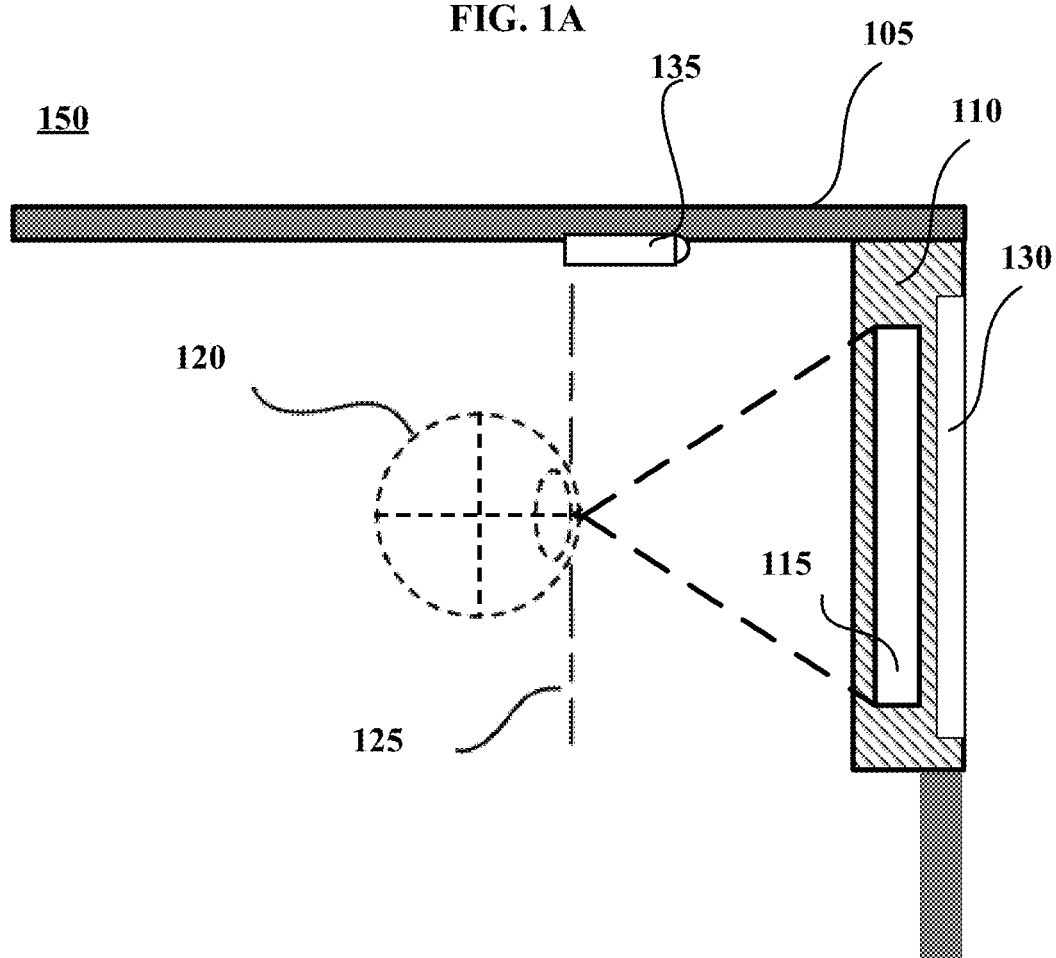
FIG. 1B illustrates a cross-sectional view of the NED in FIG. 1A, according to an embodiment of the present disclosure.

FIG. 1B is a cross-section 150 of the NED 100 shown in FIG. 1A according to an embodiment of the present disclosure. The display 110 may include at least one waveguide display assembly 115. An exit pupil 125 may be a location where the eye 120 is positioned in an eye-box region when the user wears the NED 100. For purposes of illustration, FIG. 1B shows the cross section 150 associated with a single eye 120 and a single waveguide display assembly 115, but in alternative embodiments not shown, another display assembly which is separate from the waveguide display assembly 115 shown in FIG. 1B, may provide image light to an eye-box located at an exit pupil of another eye of the user.

The waveguide display assembly 115, as illustrated below in FIG. 1B, is configured to direct the image light to an eye-box located at the exit pupil 125 of the eye 120. The waveguide display assembly 115 may be composed of one or more materials (e.g., plastic, glass, etc.) with one or more refractive indices that effectively minimize the weight and widen a field of view (FOV) of the NED 100. In some embodiments, the waveguide display assembly 115 may be a component (e.g., the display 110) of the NED 100. In some embodiments, the waveguide display assembly 115 may be part of some other NED, or other system that directs display image light to a particular location. As shown in FIG. 1B, the waveguide display assembly 115 may be for one eye 120 of the user. The waveguide display assembly 115 for one eye may be separated or partially separated from the waveguide display assembly 115 for the other eye. In certain embodiments, a single waveguide display assembly 115 may be used for both eyes 120 of the user.

In some embodiments, the NED 100 may include one or more optical elements between the waveguide display assembly 115 and the eye 120. The optical elements may act to, e.g., correct aberrations in image light emitted from the waveguide display assembly 115, magnify image light emitted from the waveguide display assembly 115, some other optical adjustment of image light emitted from the waveguide display assembly 115, or some combination thereof. The example for optical elements may include an aperture, a Fresnel lens, a convex lens, a concave lens, a filter, or any other suitable optical element that affects image light. In some embodiments, the NED 100 may include an adaptive or a tunable dimming device 130, which may be a global or local dimming device. The adaptive dimming device 130 may be tunable by an external field, for example, an electric field, a magnetic field, or a light. The adaptive dimming device 130 may dynamically adjust the transmittance of the see-through view observed through the NED 100, thereby switching the NED 100 between a VR device and an AR device or between a VR device and a MR device. In some embodiments, with switching between the AR/MR device and the VR device, the adaptive dimming device 130 may be used in the AR device to mitigate difference in brightness of the see-through view and the virtual image. In some embodiments, the adaptive dimming device 130 may dynamically attenuate a light from the real-world environment depending on brightness of the real-world environment, thereby adjusting the brightness of the see-through view. The adaptive dimming device 130 may include any suitable adaptive dimming devices, such as a guest-host LC type dimming device, polarizers including LC type diming device, an electrochromic diming device, or a photochromic diming device, etc. Exemplary waveguide display assembly 115 will be described in detail in conjunction with FIG. 2 and FIG. 3.

Figure 2:
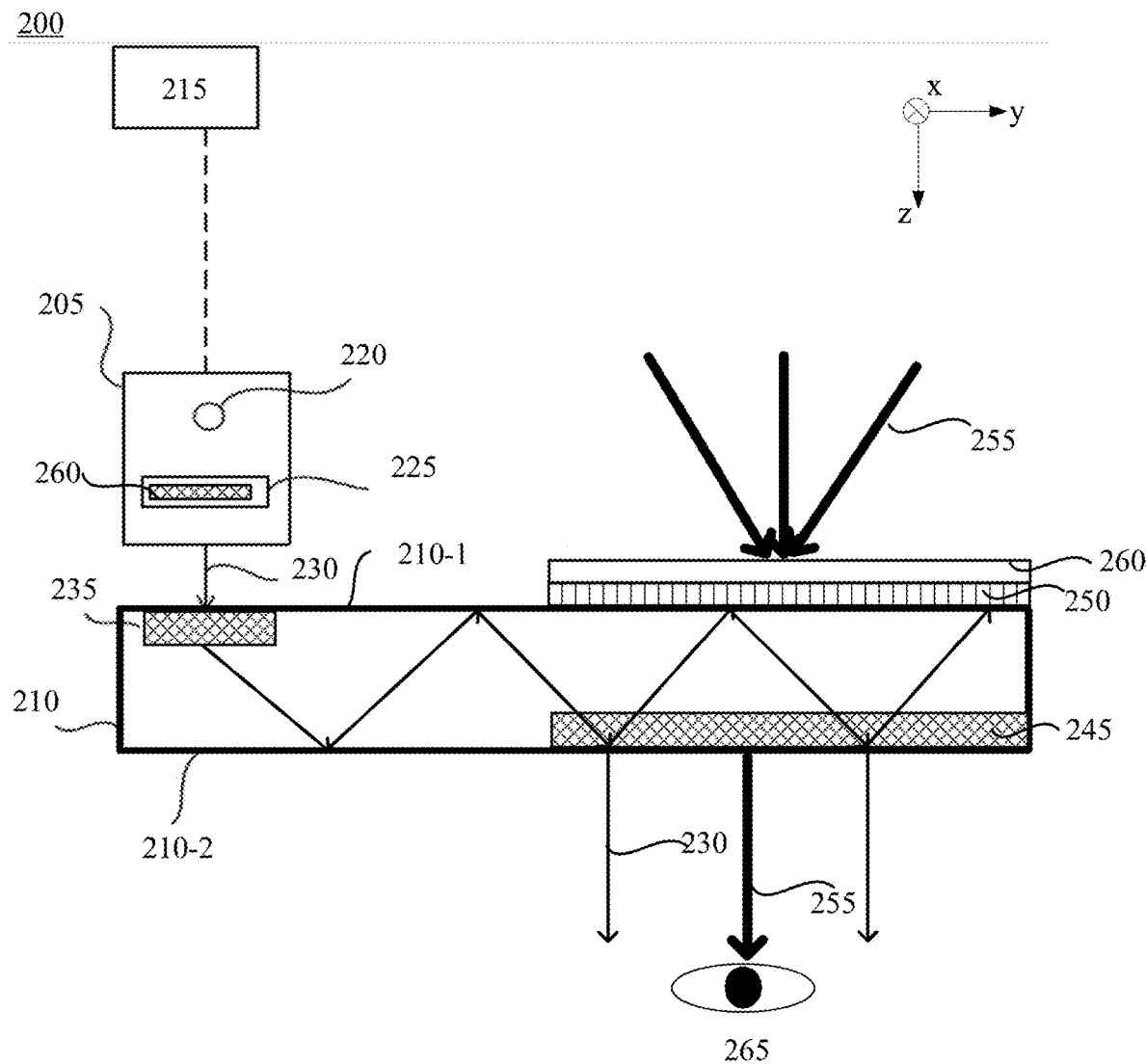
FIG. 2 illustrates a schematic diagram of a waveguide display assembly in a NED, according to an embodiment of the present disclosure.

FIG. 2 illustrates a schematic diagram of a waveguide display assembly 200 according to an embodiment of the present disclosure. The waveguide display assembly 200 may be the waveguide display assembly 115 in FIG. 1B. As shown in FIG. 2, the waveguide display assembly 200 may include a source assembly 205, a waveguide 210, an angularly selective dimming element 250, and a controller 215. The source assembly 205 may include a source 220 and an optics system 225. The source 220 may be a light source that generates coherent or partially coherent light. The source 220 may include, e.g., a laser diode, a vertical cavity surface emitting laser, and/or a light emitting diode. In some embodiments, the source 220 may be a display panel, such as a liquid crystal display (LCD) panel, an liquid-crystal-on-silicon (LCoS) display panel, an organic light-emitting diode (OLED) display panel, a micro light-emitting diode (micro-LED) display panel, a digital light processing (DLP) display panel, or some combination thereof. In some embodiments, the source 220 may be a self-emissive panel, such as an OLED display panel or a micro-LED display panel. In some embodiments, the source 220 may be a display panel that is illuminated by an external source, such as an LCD panel, an LCoS display panel, or a DLP display panel. Examples of an external sources may include a laser, an LED, an OLED, or some combination thereof. The optics system 225 may include one or more optical components that condition the light from the source 220. Conditioning light from the source 220 may include, e.g., transmitting, attenuating, expanding, collimating, and/or adjusting orientation in accordance with instructions from the controller 215.

The source assembly 205 may generate an image light 230 and output the image light 230 to an in-coupling element 235 located at the waveguide 210. The waveguide 210 may expand image light 230 to an eye 265 of the user. The waveguide 210 may receive the image light 230 at one or more in-coupling elements 235 located at the waveguide 210, and guide the received image light 230 to an out-coupling element 245 located at the waveguide 210, such that the received input image light 230 is decoupled out of the waveguide 210 towards the eye 265 via the out-coupling element 245.

In some embodiments, the in-coupling element 235 may couple the image light 230 from the source assembly 205 into the waveguide 210. The waveguide 210 may include a first surface 210-1 facing the real-world and an opposing second surface 210-2 facing the eye 265. The in-coupling element 235 may be part of, or affixed to, the first surface 210-1 or the second surface 210-2 of the waveguide 210. In some embodiments, as shown in FIG. 2, the in-coupling element 235 may be part of, or affixed to, the first surface 210-1 of the waveguide 210. In some embodiments, the in-coupling element 235 may be part of, or affixed to, the second surface 210-2 of the waveguide 210. The in-coupling element 235 may include, for example, a surface relief grating, a volume hologram, a polarization grating, a polarization volume hologram, a metasurface grating, or other types of diffractive elements, or some combination thereof. In some embodiments, the in-coupling element 235 may include a diffraction grating, and a pitch of the diffraction grating may be chosen such that the total internal reflection occurs in the waveguide 210, and the image light 230 may propagate internally in the waveguide 210 (e.g., by total internal reflection). The in-coupling element 235 is also referred to as an in-coupling grating.

The out-coupling element 245 may be part of, or affixed to, the first surface 210-1 or the second surface 210-2 of the waveguide 210. In some embodiments, as shown in FIG. 2, the out-coupling element 245 may be part of, or affixed to, the second surface 210-2 of the waveguide 210. In some embodiments, the out-coupling element 245 may be part of, or affixed to, the first surface 210-1 of the waveguide 210. In some embodiments, the out-coupling element 245 may include a surface relief grating, a volume hologram, a polarization grating, a polarization volume hologram, a metasurface grating, or other types of diffractive elements, or some combination thereof. In some embodiments, the out-coupling element 245 may include a diffraction grating, and the pitch of the diffraction grating may be configured to cause the incident image light 230 to exit the waveguide 210, i.e., redirecting image light 230 so that total internal reflection no longer occurs. Such a grating is also referred to as an out-coupling grating.

Figure 3:
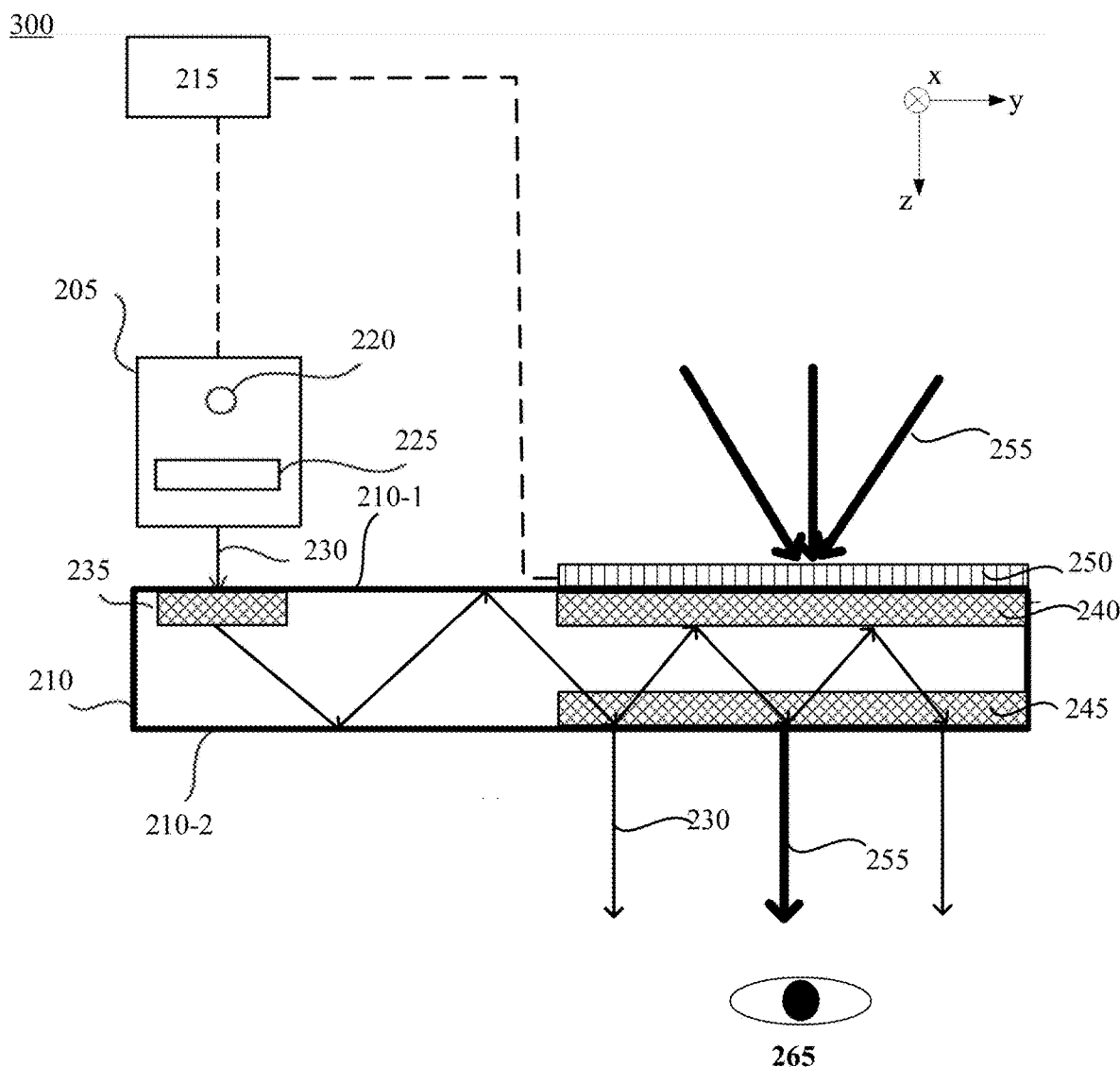
FIG. 3 illustrates a schematic diagram of a waveguide display assembly in a NED, according to another embodiment of the present disclosure.

In some embodiments, the waveguide display assembly 200 may include additional gratings which redirect/fold and/or expand the pupil of the projector 205, and an exemplary structure may be described in detail in conjunction with FIG. 3. In some embodiments, multiple functions, e.g., redirecting/folding and/or expanding the pupil of the projector 205 may be combined into a single grating, e.g. an out-coupling grating. In some embodiments, some above-mentioned gratings may be divided in several sections (subgratings), for example for tiling field of view (FOV).

The waveguide 210 may be composed of one or more materials that facilitate total internal reflection of the image light 230. The waveguide 210 may be composed of, for example, plastic, glass, and/or polymers. The waveguide 210 may have a relatively small form factor. For example, the waveguide 210 may be approximately 50 mm wide along the x-dimension, 30 mm long along the y-dimension and 0.5 to 1 mm thick along the z-dimension. The controller 215 may control the operation of the source assembly 205. In some embodiments, the waveguide 210 may output the expanded image light 230 to the eye 265 with a large field of view (FOV). For example, the expanded image light 230 may be provided to the eye 265 with a diagonal FOV (in x and y) of 60 degrees or greater and/or 150 degrees or less. The waveguide 210 may be configured to provide an eye-box with a width of 8 mm or greater and/or equal to or less than 50 mm, and/or a height of 6 mm or greater and/or equal to or less than 20 mm.

In some embodiments, the waveguide display assembly 200 may include a plurality of source assemblies 205 and a plurality of waveguides 210. Each of the source assemblies 205 may emit a monochromatic image light of a specific wavelength band corresponding to a primary color (e.g., red, green, or blue). The plurality of waveguides 210 may be stacked together and separated by a gap to output an expanded image light 230 that is multi-colored. In some embodiments, the plurality of waveguides 210 may be separated by air gaps. In some embodiments, the plurality of waveguides 210 may be separated by a low refractive index material, such as a nanoporous film. In some embodiments, the waveguide display assembly 200 may include a stack of waveguides, where each waveguide is designed to handle, e.g., some portion of the field of view and color spectrum of the virtual image. Using the waveguide display assembly 200, the physical display and electronics may be moved to the side of the front rigid body and a fully unobstructed view of the real world may be achieved, therefore opening up the possibilities to true AR experiences.

The angularly selective dimming element 250 may be disposed at the first side of the waveguide 210, i.e., the side facing the see-through real-world. The angularly selective dimming element 250 may be applied directly to a diffraction element (e.g., the out-coupling element 245) or an optical element disposed adjacent to the diffraction element. The angularly selective dimming element 250 may be in a direct contract with the diffraction element (e.g., the out-coupling element 245) or may be spaced apart from the diffraction element (e.g., the out-coupling element 245) by a gap. For illustrative purposes, FIG. 2 shows the angularly selective dimming element 250 is disposed at the first side 210-1 of the waveguide 210, and arranged opposed to the out-coupling element 245 and spaced apart from the out-coupling element 245 by a gap. Light beams 255 from a real world (referred to as real-world light) may be incident onto the angularly selective dimming element 250 and dimmed by the angularly selective dimming element 250, and the transmitted light beams may propagate through the waveguide 210 towards the eye 265. Thus, the eye 265 may observe the image light 230 combined with the real-world light 255. In this way, the waveguide 210 may function as an optical combiner, e.g. an image combiner that optically combines a virtual scene optically with a real-word scene. In some embodiments, the angularly selective dimming element 250 may be applied directly to the out-coupling element 245.

The angularly selective dimming element 250 may be configured to attenuate the intensity of an incident light with an incidence angle, for example, through absorption, scattering, or reflection, or some combination thereof. That is, the attenuation of the incident light caused by the angularly selective dimming element 250 may be resulted from absorption, scattering, or reflection, or some combination thereof. In some embodiments, the angularly selective dimming element 250 may be configured to enhance the attenuation of the incident light as the incidence angle increases. In some embodiments, the angularly selective dimming element 250 may be configured to significantly attenuate or completely block an obliquely incident light having a high incidence angle (e.g., larger than 60°), and negligibly attenuate or slightly attenuate a substantially normally incident light. The light transmittance of the obliquely incident light having a high incidence angle (e.g., larger than 60°) and the substantially normally incident light may depend on the type of the angularly selective dimming element 250 and the polarization state of the incident light. In some embodiments, for a microlouver type angularly selective dimming element, the light transmittance of the obliquely incident light having a high incidence angle (e.g., larger than 60°) and the substantially normally incident light may be lower than about 10% and higher than about 60%, respectively. In some embodiments, for holographic type angularly selective dimming element, the light transmittance of the obliquely incident light having a high incidence angle (e.g., larger than 60°) and the substantially normally incident light may be lower than about 30% and higher than about 90%, respectively.

The angularly selective dimming element 250 may be disposed in an optical path of the real-world light 255 to angularly selectively attenuate the real-world light 255 before the real-world light 255 is incident onto the diffraction element (e.g., the out-coupling element 245). Thus, the real-world light 255 that is incident onto the angularly selective dimming element 250 at a high incidence angle (e.g., larger than 60°) may be significantly attenuated or completely blocked, while the real-world light 255 that is substantially normally incident ono the angularly selective dimming element 250 may be negligibly attenuated or slightly attenuated. That is, a substantial portion of the angular space corresponding to the incidence angles larger than the high incidence angle (e.g., larger than 60°) may be dimmed or completely blocked by the angularly selective dimming element 250, while the substantially normally incident light may be negligibly attenuated or slightly attenuated by the angularly selective dimming element 250. Thus, the undesired rainbow caused by the diffractive structures (e.g. gratings) at the waveguide 210 may be dimmed, while the brightness of the desired see-through image may be only slightly reduced. In some embodiments, the angularly selective dimming element 250 may be a passive element, and the angularly selective dimming element 250 may have fixed angular characteristic.

In some embodiments, the angular dependence of the angularly selective dimming element 250 may be polarization selective/sensitive, for example, the angular dependence of the angularly selective dimming element 250 may be stronger for an incident light having a certain polarization than other polarizations. To enhance the angularly selectivity, the angularly selective dimming element 250 may be optically coupled with a polarizer. In one embodiment, as shown in FIG. 2, a polarizer 260 may be coupled to the angularly selective dimming element 250, the polarizer 260 may convert the real-world light 255 to a polarized light propagating towards the angularly selective dimming element 250. A transmission axis of the polarizer 260 may be orientated relative to the angularly selective dimming element 250, such that the angular dependence of the angularly selective dimming element 250 may be maximized for the polarized light transmitted through the polarizer 260. In some embodiments, the polarizer 260 may be a linear polarizer. In some embodiments, the polarizer 260 may be a circular polarizer. In some embodiments, the angularly selective dimming element 250 may be combined with an electrically or optically tunable dimming element (e.g., the adaptive dimming device 130 in FIG. 1B) used to attenuate the real-world light at a bright environment, thereby additionally attenuating the real-world light 255 depending on brightness of environment.

FIG. 3 illustrates a schematic diagram of another waveguide display assembly in a NED according to an embodiment of the present disclosure. The similarities between FIG. 2 and FIG. 3 are not repeated, while certain difference may be explained. As shown in FIG. 3, the waveguide display assembly 200 may further include a directing element 240 that redirects the received input image light 230 to the out-coupling element 245, such that the received input image light 230 is decoupled out of the waveguide 210 via the out-coupling element 245. The directing element 240 may be part of, or affixed to, the first side 210-1 of the waveguide 210. The out-coupling element 245 may be part of, or affixed to, the second side 210-2 of the waveguide 210, such that the directing element 240 is arranged opposed to the out-coupling element 245.

In some embodiments, the directing element 240 and the out-coupling element 245 may be structurally similar. The directing element 240 may include, for example, a surface relief grating, a volume hologram, a polarization grating, a polarization volume hologram, a metasurface grating, or other types of diffractive elements, or some combination thereof. In some embodiments, the directing element 240 may be a diffraction grating, the pitch of the diffraction grating is chosen to cause incident image light 230 to exit the waveguide 210 at angle(s) of inclination relative to a surface of the out-coupling element 245. The directing element 240 is also referred to as a folding grating. The angularly selective dimming element 250 may be disposed at the first side 210-1 of the waveguide 210, and may be arranged opposed to the out-coupling element 245 and the directing element 240. The real-world light 255 may be angularly selectively attenuated by the angularly selective dimming element 250, and then incident onto the directing element 240 and the out-coupling element 245. Thus, the undesired rainbow caused by the diffractive structures (e.g. the directing element 240 and the out-coupling element 245) at the waveguide 210 may be dimmed, while the brightness of the desired see-through image may be only slightly reduced.

Figure 4A:
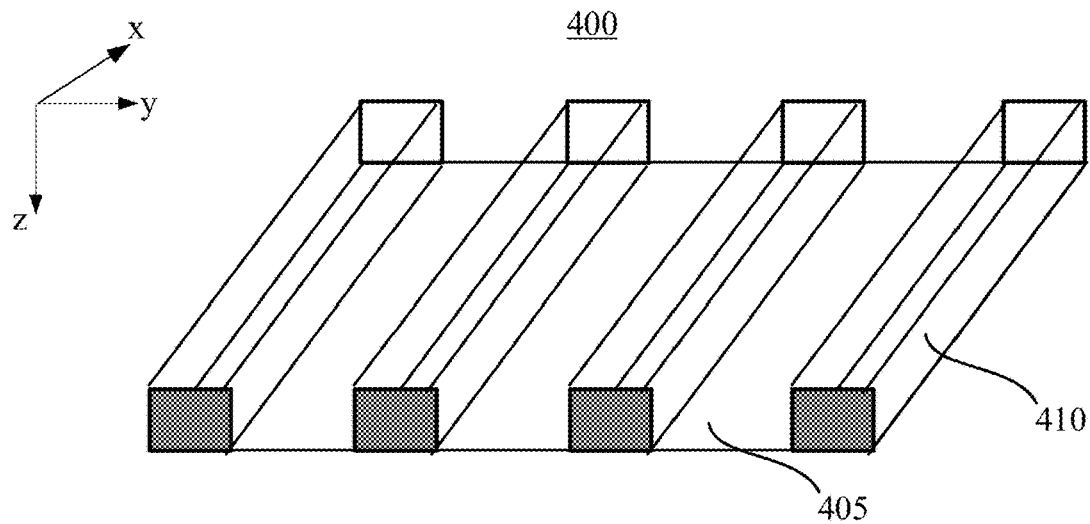
FIG. 4A illustrates a schematic diagram of an angularly selective dimming element, according to an embodiment of the present disclosure.
Figure 4B:
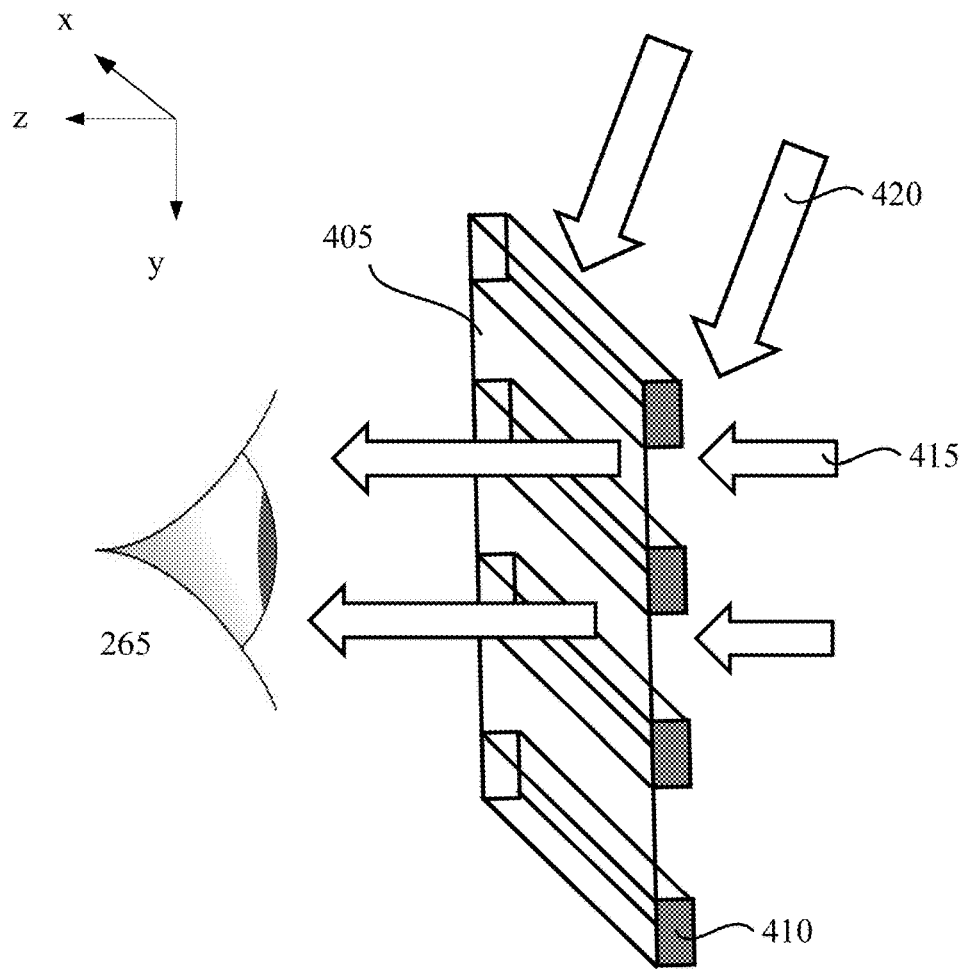
FIG. 4B illustrates an operation of the angularly selective dimming element in FIG. 4A, according to an embodiment of the present disclosure.

The angularly selective dimming element 250 may be any appropriate dimming element capable of attenuating an incident light with an incidence angle. FIG. 4A illustrate a schematic diagram of an angularly selective dimming element 400, according to an embodiment of the present disclosure, and FIG. 4B illustrates an operation of the angularly selective dimming element 400 in FIG. 4A, according to an embodiment of the present disclosure. The angularly selective dimming element 400 may be a film including a plurality of louver structures (e.g., microlouvers) configured to enhance an attenuation of an incident light as the incidence angle increases. In some embodiments, the angularly selective dimming element 400 may be referred to as a microlouver sheet.

As shown in FIG. 4A, the angularly selective dimming element 400 may include a substrate 405 having a first surface and an opposing second surface, and a plurality of louver structures 410 (e.g., microlouvers) formed on or bonded to the first surface of the substrate 405. The first surface of the substrate 405 may be arranged facing the real world, and the second surface of the substrate 405 may be arranged facing eyes of the user. The substrate 405 may provide support and protection to the louver structures 410. The substrate 405 may be optically transparent in spectrum bands of interest. In some embodiments, the substrate 405 may be optically transparent in the visible band (about 380 nm to about 700 nm). In some embodiments, the substrate 405 may be optically transparent in both the visible band (about 380 nm to about 700 nm) and some or all of the infrared (IR) band (about 700 nm to about 1 mm). The substrate 405 may be made of an organic and/or inorganic material that is substantially transparent to the light of above-listed wavelengths range, for example, the substrate 405 may be glass, fused silica, sapphire, a polymer, or any suitable transparent optical substrate. The substrate 405 may be rigid or flexible. In some embodiments, the substrate 405 may also be a part of another optical device or another optoelectrical device. For example, the substrate 405 may be a part of an optical waveguide made of a suitable material, such as glass, plastics, or sapphire or some combination thereof. In some embodiments, the substrate 405 and the louver structure 410 may have the same materials. In some embodiments, the substrate 405 and the louver structure 410 may have different materials.

The plurality of louver structures 410 may be non-transparent or semitransparent in spectrum bands of interest. The plurality of louver structures 410 may be parallelly disposed and separated from each other by a distance S. In some embodiments, the distances S between the louver structures 410 may be uniform, for example, as FIG. 4A shows. In some embodiments, the distances S between the louver structures 410 may be randomized to minimize interference effects. A longitudinal dimension of the louver structure 410 may be parallel to the first surface of the substrate 405, in other words, the louver structure 410 may elongated in a direction parallel to the first surface of the substrate 405. For example, the louver structure 410 may have a length (i.e., longitudinal dimension) of L in the x-direction, a width of W in the y-direction, and a depth of D in the z-direction. The length L may be substantially the same as the length of the substrate 405. The width W of the louver structure 410 may be relatively small compared to the length L of the louver structure 410. In addition, the width W of the louver structure 410 may be relatively small compared to the depth D or distances S between the louver structures 410, thereby increasing the transmission of the light that is substantially normally incident onto the angularly selective dimming element 400.

In some embodiments, the louver structure 410 may be produced by, for example, dispensing a light attenuating material that attenuates an incident light via absorption (complete absorption or partial absorption) and/or scattering on the substrate 405. The distance S between the louver structures 410 and the depth D of the louver structures 410 may be configured, such that the louver structures 410 may weakly attenuate a substantially normally incident light 415 (i.e., transmit most of a substantially normally incident light 415 towards the eye 265), but significantly attenuate or completely block (e.g., through absorption and/or scattering) an obliquely incident light 420 having a substantially high incidence angle (e.g., larger than 60°), as FIG. 4B shows. Thus, the undesired rainbow caused by the diffraction of the obliquely incident light 420 having a high incidence angle (e.g., larger than 60°) may be dimmed, while the brightness of the desired see-through image may be only slightly reduced.

In some embodiments, the louver structure 410 may be produced by printing ink on the substrate 405. The distance S between the louver structures 410 and the depth D of the louver structures 410 may be configured, such that the louver structures 410 may weakly attenuate the substantially normally incident light 415 (i.e., transmit most of the substantially normally incident light 415 towards the eye 265), but significantly absorb or completely absorb the obliquely incident light 420 having a substantially high incidence angle (e.g., larger than) 60°, as FIG. 4B shows. Thus, the undesired rainbow caused by the diffraction of the obliquely incident light 420 having a high incidence angle (e.g., larger than 60°) may be dimmed, while the brightness of the desired see-through image may be only slightly reduced. In some embodiments, the louver structure 410 may be produced by dispensing and processing photoresist or photo/thermal-cross-linkable materials on the substrate 405.

In some embodiments, the louver structures 410 may be isotropic, for example, the attenuation may be substantially uniform for an arbitrary polarized light given the same incidence angle. In some embodiments, the louver structures 410 may be anisotropic. The louver structures 410 may be made of an anisotropic material, such as a photo/thermal cross-linkable liquid crystal (LC) material, where molecules of the anisotropic materials may be aligned in a predetermined direction, for example, by an alignment layer disposed on the first surface of the substrate 405. In some embodiments, the LC material may be doped by dichroic dye or dyes with the absorption covering spectrum bands of interest, such as the visible range. In some embodiments, the louver structures 410 may strongly absorb and/or scatter an incident light polarized (or having E-field) parallel to the predetermined direction and having a substantially high incidence angle (e.g., larger than 60°), and weakly absorb and/or scatter an incident light polarized (or having E-field) perpendicular to the predetermined direction and having a substantially high incidence angle (e.g., larger than 60°). In some embodiments, the louver structures 410 may strongly absorb and/or scatter an incident light polarized (or having E-field) perpendicular to the predetermined direction and having a substantially high incidence angle (e.g., larger than 60°), and weakly absorb and/or scatter an incident light polarized (or having E-field) parallel to the predetermined direction and having a substantially high incidence angle (e.g., larger than 60°). That is, the louver structures 410 may be polarization selective. Thus, to enhance the effect of angularly selectivity, the angularly selective dimming element 400 may be optically coupled with a linear polarizer transmitting a polarized light that would be strongly absorbed and/or scattered by the louver structures 410 towards the angularly selective dimming element 400.

For example, the louver structures 410 may strongly absorb and/or scatter a p-polarized incident light having a substantially high incidence angle (e.g., larger than 60°), but weakly absorb and/or scatter an s-polarized incident light having a substantially high incidence angle (e.g., larger than 60°). An arbitrary linearly polarized light can be decomposed into a p-polarized component and an s-polarized component. Thus, to enhance the effect of angularly selectivity, the angularly selective dimming element 400 may be optically coupled with a linear polarizer transmitting a p-polarized light towards the angularly selective dimming element 400.

Figure 5B:
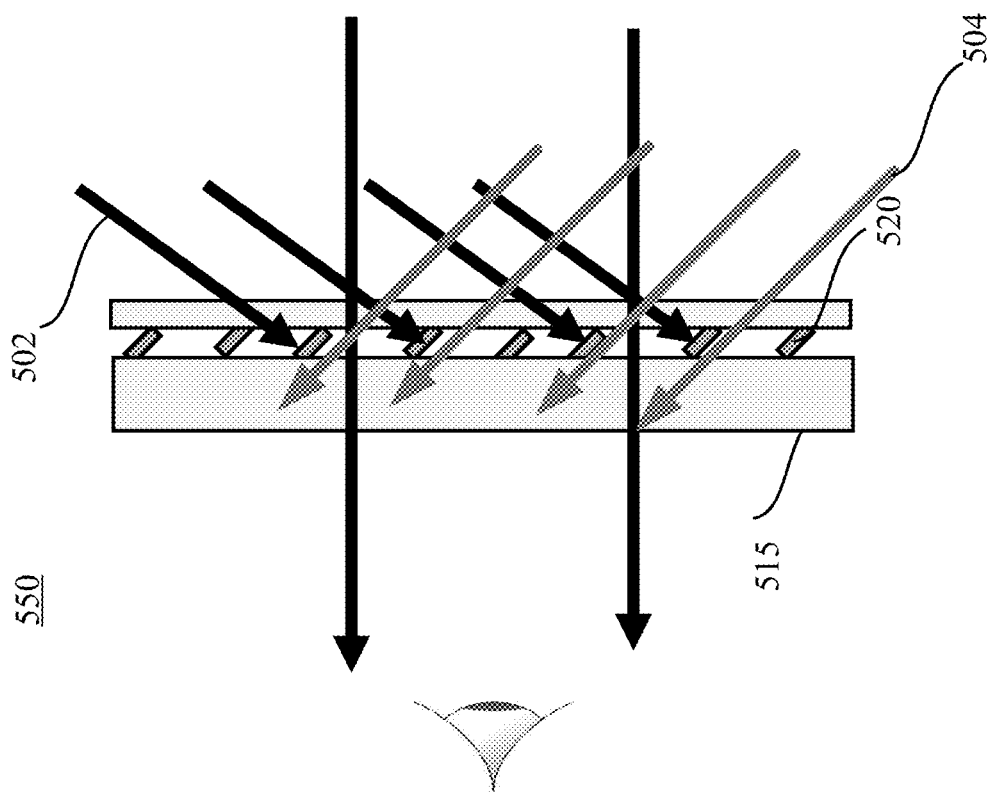
FIG. 5B illustrates a schematic diagram of an angularly selective dimming element, according to another embodiment of the present disclosure.
Figure 5A:
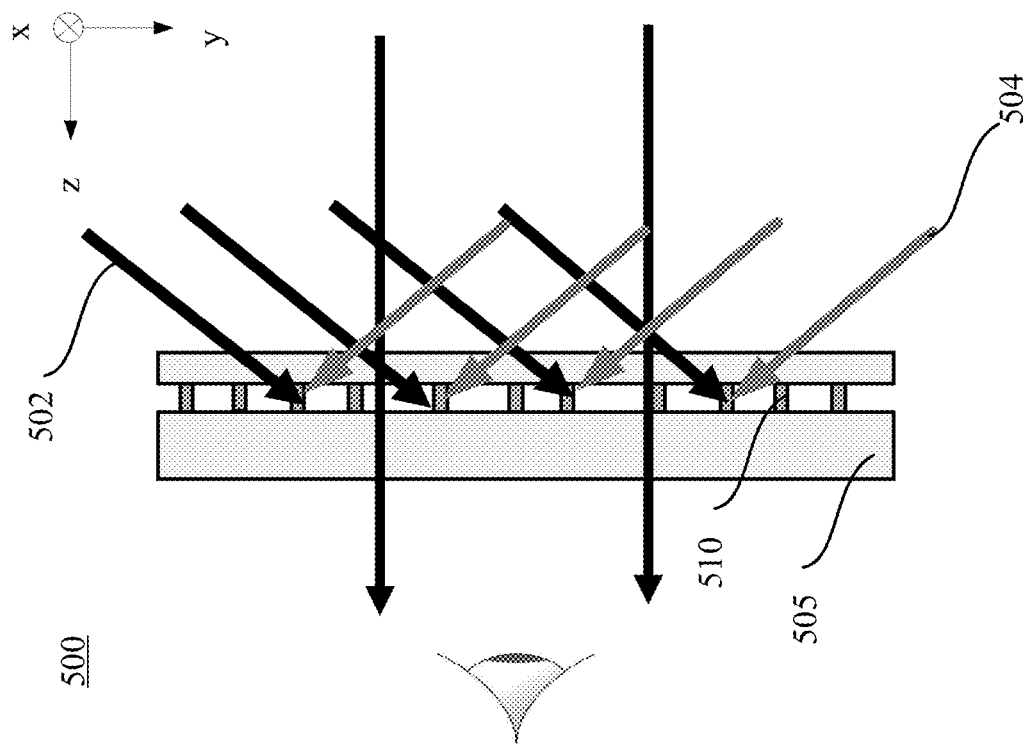
FIG. 5A illustrates a schematic diagram of an angularly selective dimming element, according to another embodiment of the present disclosure.

FIG. 5A illustrates a schematic diagram of an angularly selective dimming element 500, according to another embodiment of the present disclosure, and FIG. 5B illustrates a schematic diagram of an angularly selective dimming element 550, according to another embodiment of the present disclosure. FIGS. 5A-5B illustrate an yz-sectional view of the angularly selective dimming elements. The angularly selective dimming elements may include two substrates for support and protection purposes, and a plurality of louver structures sandwiched between the two substrates. The two substrates may be similar to the substrate 405 in FIG. 4A, and the details are not repeated here.

As shown in FIG. 5A, the angularly selective dimming element 500 may include two substrates 505, and a plurality of louver structures 510 sandwiched between the two substrates 505. The louver structures 510 may be elongated in the x-direction, and the louver structures 510 may be not slated with respect to the first surface of the substrate 505, such that the light incident from above and below at a substantially high incidence angle (e.g., larger than) 60° may be effectively dimmed or blocked. For example, a light 502 incident from above at a substantially high incidence angle (e.g., larger than 60°) may be effectively dimmed or blocked. In addition, a light 504 incident from below at a substantially high incidence angle (e.g., larger than 60°) may be effectively dimmed or blocked.

As shown in FIG. 5B, the angularly selective dimming element 500 may include two substrates 515, and a plurality of louver structures 520 sandwiched between the two substrates 505. The louver structures 515 may be elongated in the x-direction, and the louver structures 515 may be slated with respect to the first surface of the substrate 515, such that only the light imping under a substantially high incidence angle (e.g., larger than 60°) from a direction that is above the louver structures 510 may be effectively dimmed or blocked. For example, the light 502 imping under a substantially high incidence angle (e.g., larger than 60°) from a direction above the louver structures 510 may be effectively dimmed or blocked, while the light 504 imping under a substantially high incidence angle (e.g., larger than 60°) from a direction below the louver structures 510 may be transmitted through without being affected by the louver structures 510. Thus, a viewing angle in a vertical direction (e.g., y direction in FIG. 5B) may be improved. In a practical application, a sun light imping under a substantially high incidence angle (e.g., larger than 60°) above a direction below the louver structures 510 may be effectively dimmed or blocked, thereby suppressing the undesired rainbow effect. On the other hand, because the light 504 imping under a substantially high incidence angle (e.g., larger than 50°) from the direction below the louver structures 510 may be transmitted through without being affected by the louver structures 510. It is to be noted that FIGS. 5A-5B show each louver structure has a rectangular cross-section, which is for illustrative purposes and is not intended to limit the scope of the present disclosure. In some embodiments, the louver structure may have a cross-section different from the rectangular shape, such as a triangular shape, a trapezoidal shape, or an elliptical shape, etc.

Figure 6:
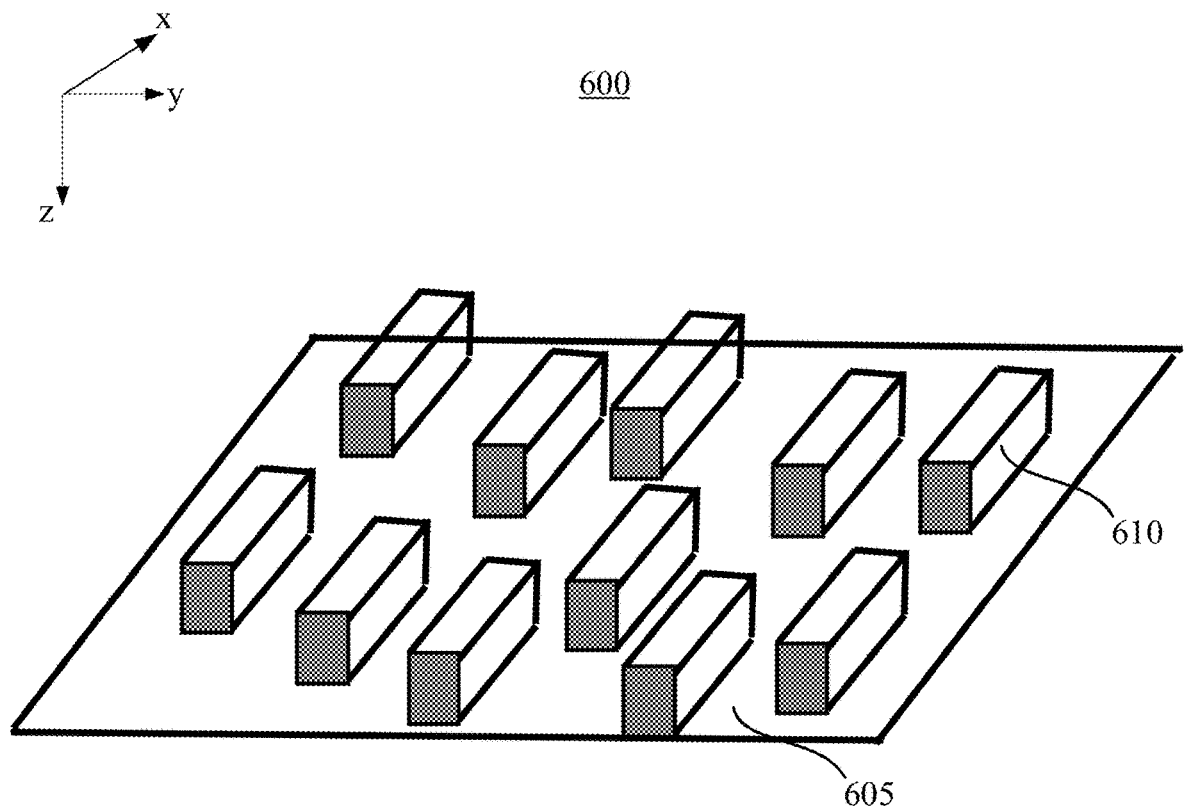
FIG. 6 illustrates a schematic diagram of an angularly selective dimming element, according to another embodiment of the present disclosure.

FIG. 6 illustrate a schematic diagram of an angularly selective dimming element 600, according to another embodiment of the present disclosure. The similarities between FIG. 4A and FIG. 6 are not repeated, while certain differences may be explained. As shown in FIG. 6, the angularly selective dimming element 600 may include a substrate 605 having a first surface and an opposing second surface and a plurality of louver structures 610 (e.g., microlouvers) formed on or bonded to the first surface of the substrate 605. Different from the elongated louver structures 410 having a substantially same length as the substrate 405 in FIG. 4A, the louver structures 610 in FIG. 6 may have a smaller length than the substrate 605. The louver structures 610 may be randomly distributed on the first surface of the substrate 605 in a plurality of rows and a plurality of columns. The distances S between the louver structures 610 may be varied to minimize a coherent diffraction effect, i.e., preventing the plurality of louver structures 610 from functioning like a grating. In addition, the louver structure 610 having a rectangular cross-section is for illustrative purposes and is not intended to limit the scope of the present disclosure. In some embodiments, the louver structure 610 having cylindrical, prismatic, pyramidal and other shapes is possible. For example, the louver structure 610 may be pillars made of an absorbing material. The pillars may be distributed randomly on the substrate to avoid interference effects. The pillars may be oriented normally to the substrate 605 or tilted in a predetermined direction.

In the disclosed embodiments, through configuring various parameters of the louver structures included in the angularly selective dimming element, such as the distance between the louver structures and the depth of the louver, the angularly selective dimming element may be allowed to slightly attenuate the substantially normally incident light, but significantly attenuate or completely block the obliquely incident light having a substantially high incidence angle (e.g., larger than 60°). Accordingly, the undesired rainbow caused by the obliquely incident light having a large incidence angle (e.g., larger than 60°) may be dimmed, while the brightness of the desired see-through images may be only slightly reduced.

Figure 7:
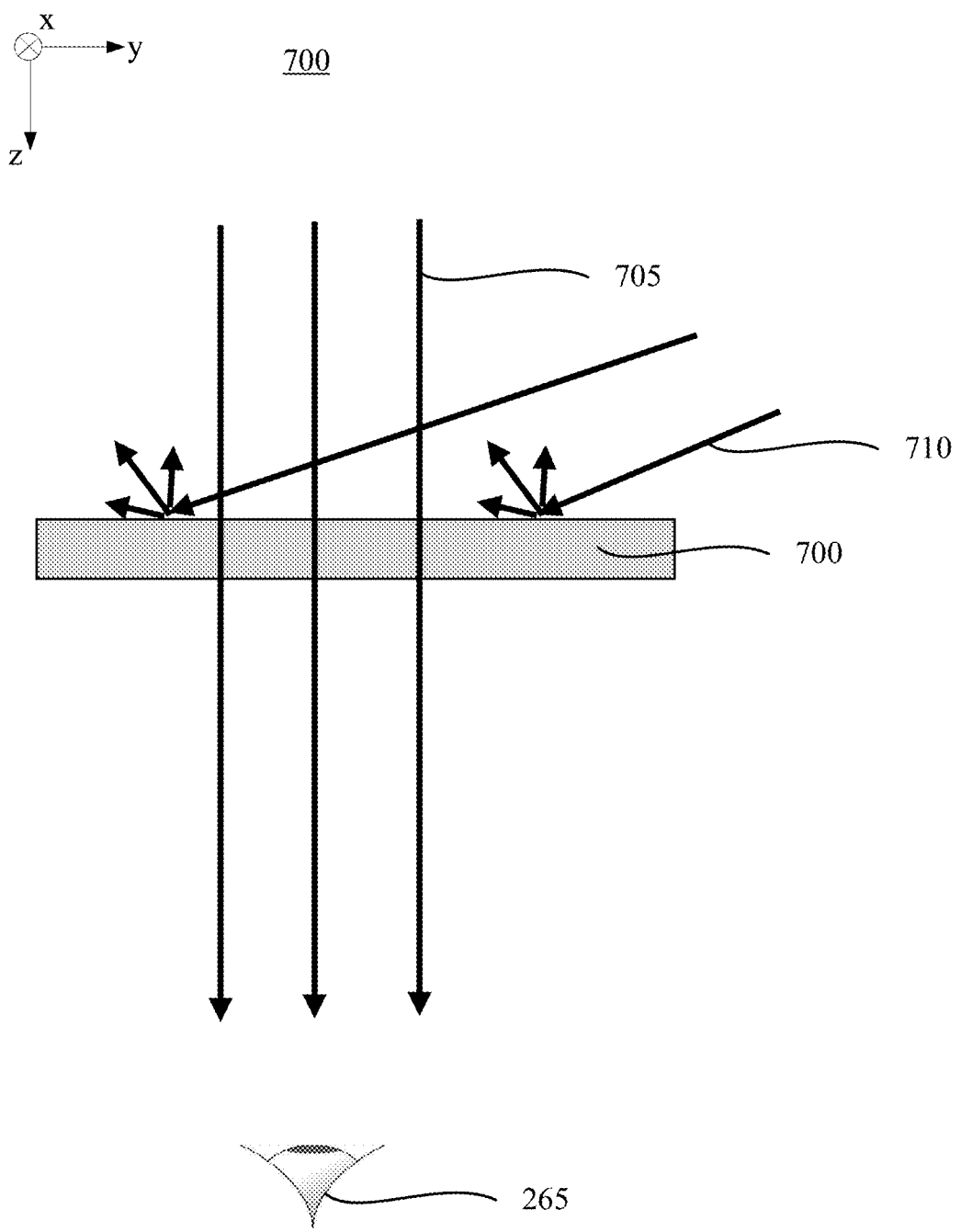
FIG. 7 illustrates a schematic diagram of an angularly selective dimming element, according to another embodiment of the present disclosure.

FIG. 7 illustrates a schematic diagram of an angularly selective dimming element, according to another embodiment of the present disclosure. The angularly selective dimming element may include a holographic dimming element 700 configured to attenuate an intensity of a light having an incidence angle in a predetermined range (e.g., larger than 60°). The holographic dimming element 700 may enhance an attenuation of the light having the incidence angle in the predetermined range through backward and/or forward diffusion. In some embodiments, the holographic dimming element 700 may be a holographic diffuser 700 that enhances an attenuation of the light having the incidence angle in the predetermined range via Bragg diffraction on a randomized reflective grating. For illustrative purposes, FIG. 7 shows the backward diffusion of the holographic diffuser 700. The functions of the holographic diffuser 700 may be realized, for example, by a holographic optical element (HOE) that is produced at a thin film of holographic materials, i.e., a holographic film, via a holographic recording. The holographic materials used for holographic recording are also referred to as recording materials. The HOE may be configured with a plurality of grating structures (e.g., Bragg grating structures) in the holographic recording, and the obtained holographic diffuser 700 may diffuse a light primarily by Bragg diffraction (i.e., diffract a light that satisfies the Bragg condition). The holographic diffuser 700 may also be referred to as a randomized reflective grating. The holographic diffuser 700 may be highly efficient at diffusing a light that satisfies the Bragg condition. In some embodiments, the holographic diffuser 700 may include a polarization insensitive Bragg grating that is holographically recorded at an isotropic recording material. In some embodiments, the holographic diffuser 700 may include a polarization volume grating (PVG) that is holographically recorded at a polarization sensitive recording material. Thus, to enhance the effect of angularly selectivity, the holographic diffuser 700 may be optically coupled with a polarizer transmitting a pre-determined linearly or circularly polarized light towards the holographic diffuser 700. The holographic materials (or the recording materials) may include photographic emulsions (e.g., silver halide emulsions), dichromated gelatin, photoresists, photo-thermoplastics, photopolymers, or photorefractive materials, or some combinations thereof. The photopolymers are featured with high diffraction efficiency that is approaching 100% under specific conditions, low absorption and scattering, easy processing, good transmission coefficients and wavelength multiplexing for full-color recording and, thus, are popular recording materials.

As shown in FIG. 7, the grating structures (e.g., Bragg grating structures) in the holographic film of the holographic diffuser 700 may be established and configured in the hologram recording process, such that the diffraction profile (more particular, the diffusing profile) of the holographic diffuser 700 may be determined. Accordingly, the holographic diffuser 700 may be configured to weakly attenuate a substantially normally incident light 705 (i.e., transmit most of a substantially normally incident light 705 towards the eye 265), but significantly attenuate or completely block an obliquely incident light 710 having a substantially high incidence angle (e.g., larger than 60°) via backward diffusion, which is resulted from Bragg diffraction. Thus, the undesired rainbow caused by the diffraction of obliquely incident light having a high incidence angle (e.g., larger than 60°) may be dimmed, while a good see-through may be realized for Bragg mismatched directions.

In some embodiments, the hologram recorded on the photopolymer may be a volume hologram, which provides both high wavelength selectivity and high angular Bragg selectivity. In some embodiments, to broaden the angular spectrum of the holographic diffuser 700 (e.g., to diffract light having various high incidence angles, such as ranging from about 60° to 90°), the holographic film may have a substantially small thickness, for example, about 2 μm to 8 μm, where a thinner holographic film may provide a wider angular bandwidth. In some embodiments, provided that the holographic film has enough thickness and change in refractive index, multiple holograms may be superimposed in the same volume region of the holographic film (that is referred to as a multiplexed hologram). In some embodiments, to broaden the angular spectrum of the holographic diffuser 700 (e.g., to diffract light having various high incidence angles, such as ranging from about 60° to 90°), the holograms recorded at slightly different incidence angle of a reference light beam may also be superimposed to broaden an angular spectrum of the holographic diffuser 700. The details will be discussed in FIG. 8. In some embodiments, to broaden a wavelength spectrum of the holographic diffuser 700 (e.g., to diffract high-incidence-angle light in various visible wavelengths), wavelength multiplexing for full-color recording may be used in the holographic recording.

Figure 8:
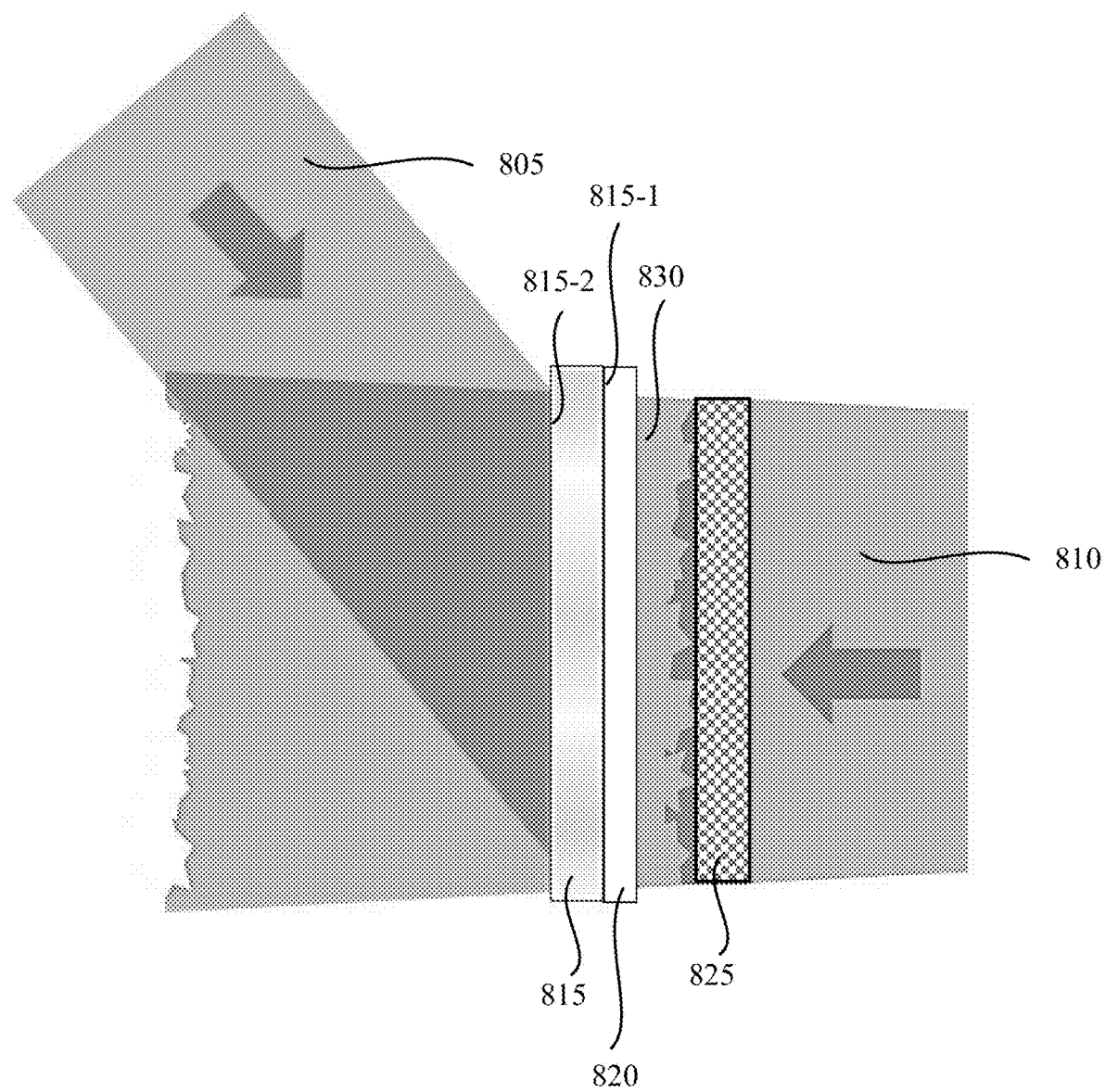
FIG. 8 illustrates a holographic recording of the angularly selective dimming element in FIG. 7, according to an embodiment of the present disclosure.

FIG. 8 illustrates a holographic recording 800 of the holographic diffuser 700 in FIG. 7 according to an embodiment of the present disclosure. As shown in FIG. 8, the hologram may be recorded on a recording material film 815 by two counter propagating coherent light beams: a reference light beam 805 and an object light beam 810. The reference light beam 805 and the object light beam 810 may fall onto the recording material film 815 from opposite sides of the recording material film 815. The recording material film 815 may be attached to a substrate 820. The recording material film 815 may have a first surface 815-1 facing the substrate 820 and an opposing second surface 815-2 far away from the substrate 820. The reference light beam 805 may propagate towards the second surface 815-2 of the recording material film 815, then incident onto the recording material film 815 at a high incidence angle (e.g., larger than 60°). The beam profile of the reference light beam 805 may depend on the specific architecture of the play back system, for example, the beam profile of a reproduction light beam to illuminate the fabricated holographic diffuser 700. For example, when the reproduction light beam is a collimated light beam, the reference light beam 805 may be a collimated light beam accordingly. The object light beam 810 may be a collimated light beam and may be scattered by a conventional diffuser 825 (e.g., a glass diffuser), resulting a forward-scattered light beam 830 propagating towards the first surface 815-1 of the recording material film 815. The interference of the reference light beam 805 and the forward-scattered light beam 830 may be recorded in the recording material film 815. After a series of subsequent steps, such as photopolymerizing and curing, the recorded hologram may be stabilized, and the holographic diffuser 700 with a desired diffusing profile may be obtained. The fabricated holographic diffuser 700 may work for the light that is incident roughly at the same angle as the reference light beam 805 at the recording stage. Further, to broaden the angular spectrum of the holographic diffuser 700 (e.g., to diffract light having various high incidence angles, such as ranging from about 60° to 90°), the holograms recorded at slightly different incidence angle of the reference light beam 805 may be superimposed. Through using different incidence directions of the reference light beam 805 and conventional diffusers 825 with different diffusing profiles in the holographic recording process, any desired diffusing profiles of the holographic diffuser 700 may be obtained, for example, the obtained holographic diffuser 700 may be enabled to diffuse light coming from the directions that are most critical for the rainbow effects.

To fabricate a high-efficiency full-color holographic diffuser by adopting wavelength multiplexing holographic recording techniques, in some embodiments, the hologram may be recorded with simultaneous exposure with several different wavelengths, for example, blue, green and red light having a central wavelength of about 448 nm, 524 nm, and 638 nm, respectively. In some embodiments, the hologram may be recorded with sequential exposure using several different wavelengths. For example, three lasers emitting light having wavelengths of 448 nm, 524 nm, and 638 nm, which correspond to the primary colors blue, green and red, respectively, may be adopted to generate the two counter propagating light beams for each primary color. The recording material film 815 may be a photopolymer film, after exposed to laser interference irradiation of the red, blue, green light either in a simultaneous exposure or sequential exposure manner for appropriate exposure time, photopolymerization may be occurred in the recording material film 815 when initiated by the photo-initiators at the three wavelengths, and independent grating patterns with different changes of refractive index may be generated in the recording material film 815.

Figure 9:
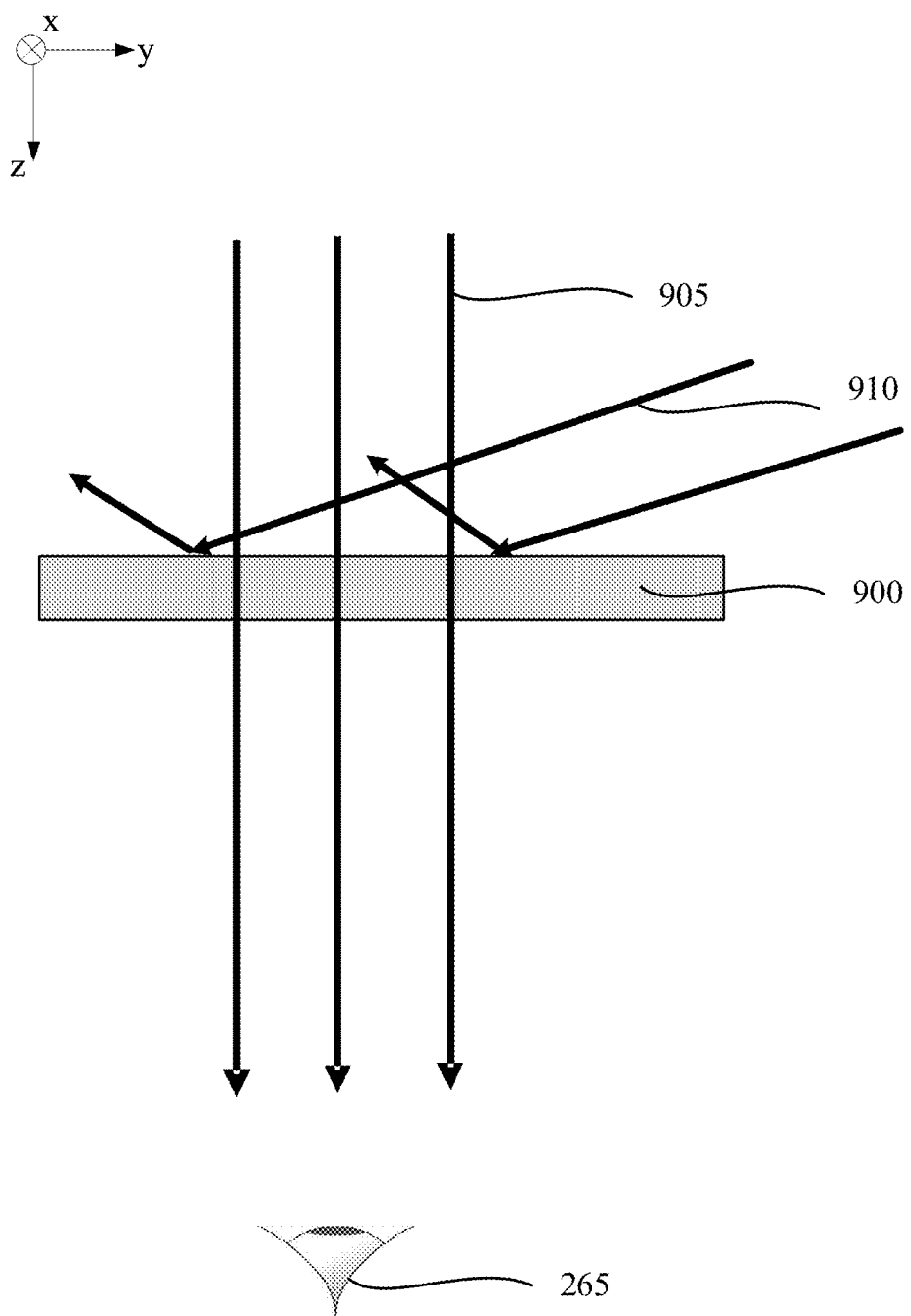
FIG. 9 illustrates a schematic diagram of an angularly selective dimming element, according to another embodiment of the present disclosure.

FIG. 9 illustrates a schematic diagram of an angularly selective dimming element, according to another embodiment of the present disclosure. The similarities between FIG. 7 and FIG. 9 are not repeated here, while certain differences may be explained. As shown in FIG. 9, the angularly selective dimming element may include a holographic dimming element 900 configured to attenuate an intensity of a light having an incidence angle in a predetermined range (e.g., larger than 60°). Different from the holographic dimming element 700 in FIG. 7 that enhances an attenuation of the light having the incidence angle in the predetermined range through diffusion, the holographic dimming element 900 in FIG. 9 may enhance an attenuation of the light having the incidence angle in the predetermined range through reflection. In some embodiments, the holographic dimming element 900 may be a reflective volume grating 900 that enhances an attenuation of the light having the incidence angle in the predetermined range via reflection that is resulted from Bragg diffraction on the reflective volume grating 900. In some embodiments, the reflective volume grating 900 may be slanted. In some embodiments, the reflective volume grating 900 may be non-slanted, and a grating vector of the reflective volume grating 900 may be perpendicular to a substrate layer where the reflective volume grating 900 is bonded to or formed on.

Similar to the holographic diffuser 700 in FIG. 7, the functions of the reflective volume grating 900 may be realized, for example, by a HOE that is produced at a thin film of holographic materials, i.e., a holographic film, via a holographic recording. The HOE may be configured with a plurality of grating structures (e.g., Bragg grating structures) in the holographic recording, and the obtained reflective volume grating 900 that is a HOE grating may reflect a light primarily by Bragg diffraction, the details are not repeated here. The recording geometry of the reflective volume grating 900 may be similar to the recording geometry (in FIG. 8) of the holographic diffuser 700 in FIG. 7, except the conventional diffuser 825 is removed out of the optical path of the object light beam 810. The fabricated reflective volume grating 900 may work for the light (i.e., may reflect the light) that is incident roughly at the same angle as the reference light beam 805 at the recording stage. In some embodiments, at the recording stage, the incident angle of the reference light beam 805 onto the recording material film 815 may be configured to be about 60° to about 90°, such that the fabricated reflective volume grating 900 may enhances the attenuation of the light having the incidence angle of about 60° to about 90° via reflection resulted from the Bragg diffraction. In some embodiments, at the recording stage, the incident angle of the reference light beam 805 onto the recording material film 815 may be configured to be about 60° to about 80°. In addition, the reflective volume grating 900 may be polarization insensitive and, thus, may dim light of all polarizations when the incidence angle is in the predetermined range.

As shown in FIG. 9, the grating structures (e.g., Bragg grating structures) in the holographic film of the reflective volume grating 900 may be established and configured in the hologram recording process, such that the diffraction profile (more particular, the reflecting profile) of the reflective volume grating 900 may be determined. Accordingly, the reflective volume grating 900 may be configured to weakly attenuate a substantially normally incident light 905 (i.e., transmit most of a substantially normally incident light 905 towards the eye 265), but significantly attenuate or completely block an obliquely incident light 910 having a substantially high incidence angle (e.g., larger than 60°) via reflection that is resulted from Bragg diffraction. Thus, the undesired rainbow caused by the diffraction of obliquely incident light having a high incidence angle (e.g., larger than 60°) may be dimmed, while a good see-through may be realized for Bragg mismatched directions.

Similar to the holographic diffuser 700 in FIG. 7, the reflective volume grating 900 may be desired to cover a wider range of incidence angles (i.e., a broader angular spectrum) and cover a wider range of incident wavelengths for practical applications. In some embodiments, the angular spectrum of the reflective volume grating 900 may be broaden via hologram angular multiplexing, where the holograms recorded at slightly different incidence angles of a reference light beam are superimposed in a same volume region of a film of holographic materials. In some embodiments, the wavelength spectrum of the reflective volume grating 900 may be broaden via multiplexing holograms designed for different wavelengths of interest, where the holograms recorded at different wavelengths of recoding light beams are superimposed in a same volume region of a film of holographic materials. For example, a wavelength multiplexing for full-color recording (e.g., red, green and blue light beams) may be used in the holographic recording of the reflective volume grating 900.

Figure 10A:
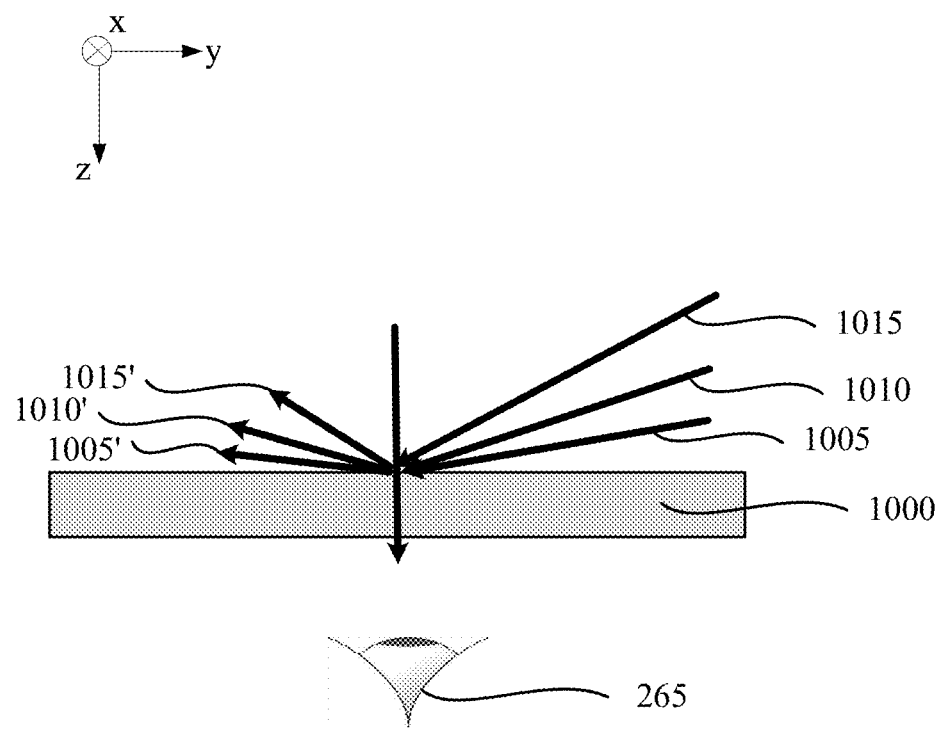
FIG. 10A illustrates a schematic diagram of a holographic dimming element with hologram angular multiplexing, according to an embodiment of the present disclosure.

FIG. 10A illustrates a schematic diagram of a holographic dimming element 1000 with hologram angular multiplexing (referred to as a multiplexed reflective grating), according to an embodiment of the present disclosure. As shown in FIG. 10A, the holographic dimming element 1000 may be a reflective volume grating, which may be an embodiment of the holographic dimming element 900 in FIG. 9. The reflective volume grating 1000 may have hologram angular multiplexing, where the holograms recorded at slightly different incidence angles of a reference light beam are superimposed in a same volume region of the film of holographic materials. Thus, the reflective volume grating 1000 may be able to highly attenuate obliquely incident light beams of various high incidence angles via reflection resulted from Bragg diffraction, and the angular spectrum of the reflective volume grating 1000 may be broaden.

Figure 10B:
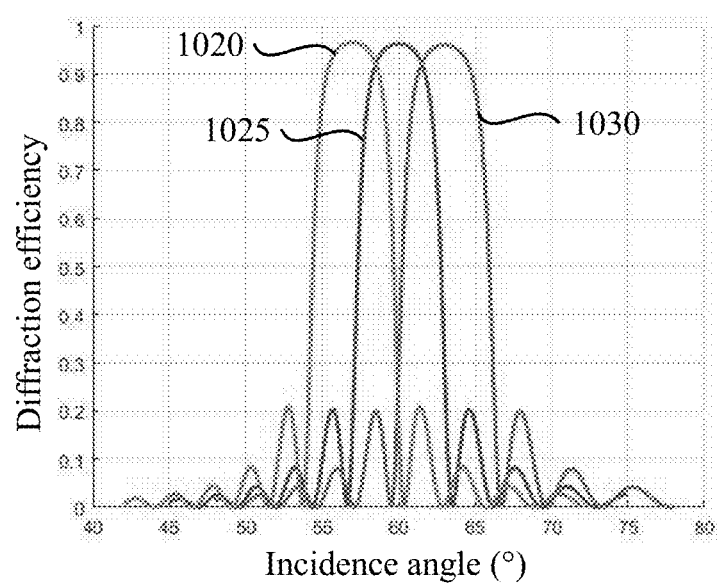
FIG. 10B illustrates incidence angle dependent diffraction efficiency of the holographic dimming element in FIG. 10A, according to an embodiment of the present disclosure.

The incidence angle difference of the reference light beam may be determined by different application scenarios, for example, the incidence angle difference of the reference light beam may be 10°, 9°, 8°, 7°, 6°, 5°, 4°, 3°, or 2°, etc. FIG. 10B illustrates incidence angle dependent diffraction efficiency of the holographic dimming element 1000 in FIG. 10A, according to an embodiment of the present disclosure. For discussion purposes, FIG. 10B shows the angular spectra of the holographic dimming element 1000 where three single holograms are multiplexed in the recording layer. The overall angular spectra of the holographic dimming element 1000 may be a superposition of overlapping elementary spectra. The three single holograms are recorded at three slightly different incidence angles (e.g., 57°, 60° and 63°, the incidence angle difference of reference light beam is 3°) of the reference light beam, and the obtained reflective volume grating 1000 is able to reflect obliquely incident light beams 1005, 1010 and 1015 of three different high incidence angles via Bragg diffraction, as FIG. 10A shows. The corresponding reflected light beams are light beams 1005', 1010' and 1015', respectively.

As shown in FIG. 10B, the horizontal and vertical axes represent the incidence angle of a light beam onto the reflective volume grating 1000 and the diffraction efficiency of the light beam, respectively. Curves 1020, 1025 and 1030 show the incidence angle dependent diffraction efficiency of the incident light beams 1005, 1010 and 1015 in FIG. 10A, respectively. As each of the curves 1020, 1025 and 1030 shows, the diffraction efficiency of the light beams decreases as the incidence angle deviates from the incidence angle of the respective reference light beams. For example, the curve 1025 shows the diffraction efficiency of light beam incident onto the hologram that is recorded at about 60° incidence angle of a reference light beam. The light beam having an incidence angle of substantially 60° has a highest diffraction efficiency, and as the incidence angle deviates from 60°, the diffraction efficiency of the light beam gradually decreases. In addition, a single hologram may have an angular spectrum of about 5° to provide high diffraction efficiency (e.g., 70% to 100%) for light beams with high incidence angles. As a group of the curves 1020, 1025 and 1030 show, the multiplexed reflective grating 1000 overall exhibits substantially high diffraction efficiency (e.g., 70% to 100%) for light beams having incidence angles of about 54° to 66°. That is, the light beams having incidence angles of about 54° to 66° may be highly attenuated by the reflective volume grating 1000 via reflection resulted from Bragg diffraction. Compared to a single hologram, the multiplexed hologram superimposed of multiple single holograms has an angular spectrum of about 12° to provide high diffraction efficiency (e.g., 70% to 100%) for light beams with high incidence angles. That is, the angular spectrum of the reflective volume grating 1000 may be broaden via the hologram angular multiplexing. Referring to FIG. 10A and FIG. 10B, by further increasing the number of holograms that are recorded at slightly different incidence angles of a reference light beam and superimposed in a same volume region of the film of holographic materials, the obtained reflective volume grating 1000 may be able to highly attenuate the light beams with a larger range of incidence angles, e.g. from about 55° to 80°, via reflection resulted from Bragg diffraction. Thus, the angular spectrum of the reflective volume grating 1000 may be further broaden. It is to be noted that the multiplexed reflective grating 1000 with three single holograms superimposed shown in FIG. 10B is for illustrative purposes and is not intended to limit the scope of the present disclosure. The angular spectra of the three single holograms and the overall angular spectrum of the multiplexed reflective grating are also for illustrative purposes, and are not intended to limit the scope of the present disclosure.

Figure 11A:
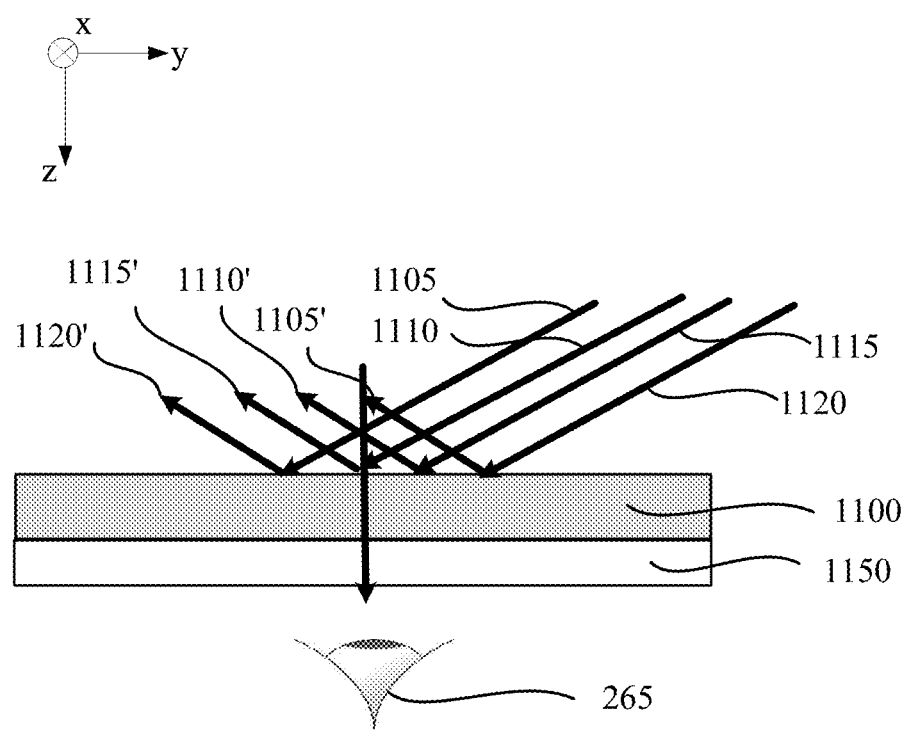
FIG. 11A illustrates a schematic diagram of a holographic dimming element with hologram wavelength multiplexing, according to an embodiment of the present disclosure.

FIG. 11A illustrates a schematic diagram of a holographic dimming element 1100 with hologram wavelength multiplexing, according to an embodiment of the present disclosure. As shown in FIG. 11A, the holographic dimming element 1100 may be a reflective volume grating, which may be an embodiment of the holographic dimming element 900 in FIG. 9. The reflective volume grating 1100 may have hologram wavelength multiplexing, where the holograms recorded at different incidence wavelengths of recoding light beams are superimposed in a same volume region of the film of holographic materials. Thus, the reflective volume grating 1100 may be able to highly attenuate obliquely incident light beams of various incidence wavelengths via reflection that is resulted from Bragg diffraction, and thus the wavelength spectrum of the reflective volume grating 1100 may be broaden. For discussion purposes, FIG. 11A shows holograms recorded at four different incidence wavelength ranges of recording light beams may be superimposed in a same volume region of the film of holographic materials, where the four recording light beams with different incidence wavelength ranges are blue, green, orange, and red light having a central wavelength of about 470 nm, 530 nm, 600 nm and 660 nm, respectively. As FIG. 11A shows, the obtained reflective volume grating 1100 is able to reflect obliquely incident light beams 1105, 1110, 1115 and 1120 of four different incidence wavelength ranges (e.g., blue, green, orange, and red light beams respectively) via Bragg diffraction, and the corresponding reflected light beams are light beams 1105', 1110', 1115' and 1120', respectively. The obliquely incident light beams 1105, 1110, 1115 and 1120 have a substantially same incidence angle.

Figure 11B:
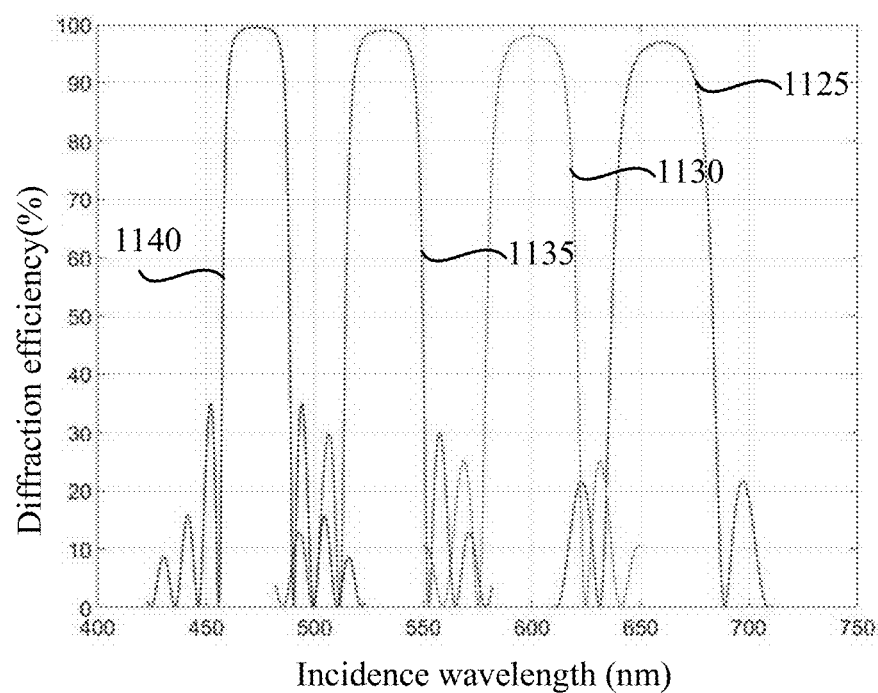
FIG. 11B illustrates wavelength dependent diffraction efficiency of the holographic dimming element in FIG. 11A, according to an embodiment of the present disclosure.

FIG. 11B illustrate incidence wavelength dependent diffraction efficiency of the holographic dimming element 1100 in FIG. 11A, according to an embodiment of the present disclosure. FIG. 11B schematically demonstrates wavelength dependent diffraction efficiency of four single holograms that are multiplexed in the recording layer. The elementary spectra do not overlap so that each color component may diffract only on the grating designed for this color. As shown in FIG. 11B, the horizontal and vertical axes represent the wavelength of an incidence light beam onto the reflective volume grating 1100 and the diffraction efficiency of the light beam, respectively. Curves 1125, 1130, 1135 and 1140 show the incidence wavelength dependent diffraction efficiency of the incident light beams 1105, 1110, 1115 and 1120 in FIG. 11A, respectively. As each of the curves 1125, 1130, 1135 and 1140 individually shows, the diffraction efficiency of the light beams decreases as the incidence wavelength deviates from the central wavelength of the respective recording light beams. For example, the curve 1130 shows the diffraction efficiency of a hologram recorded at red light. The light beam having a wavelength substantially matching the central wavelength (e.g., 600 nm) of the red light has a highest diffraction efficiency (approaching 100%), and as the incidence wavelength deviates from the central wavelength (e.g., 600 nm) of the red light, the diffraction efficiency of the light beams gradually decreases. In addition, a single hologram may have a wavelength spectrum of about 30 nm to provide high diffraction efficiency (e.g., 70% to 100%) for light beams with high incidence angles.

As a group of the curves 1125, 1130, 1135 and 1140 show, the reflective volume grating 1100 overall exhibit substantially high diffraction efficiency for light beams having a wavelength range in any one of about 460 nm to 480 nm, about 520 nm to 550 nm, about 580 nm to 620 nm and about 640 nm to 680 nm. That is, the light beams having any one of the above-mentioned wavelength ranges may be highly attenuated by the reflective volume grating 1100 via reflection resulted from Bragg diffraction. Compared to a single hologram, the superimposed multiple holograms may have a spectral width of about 130 nm to provide high diffraction efficiency (e.g., 70% to 100%) for light beams with high incidence angles. That is, the wavelength spectrum of the reflective volume grating 1100 may be broaden via the hologram wavelength multiplexing. Referring to FIG. 11A and FIG. 11B, by further increasing the number of holograms that are recorded at different incidence wavelengths of recoding light beams and superimposed in a same volume region of the film of holographic materials, the obtained reflective volume grating 1100 may be able to highly attenuate the light beams with a larger range of incidence wavelength, e.g. covering the visible wavelength range from about 400 nm to about 700 nm, via reflection resulted from Bragg diffraction. Thus, the wavelength spectrum of the reflective volume grating 1100 may be further broaden. It is to be noted that FIG. 11B that shows the multiplexed reflective grating 1100 including four single holograms superimposed is for illustrative purposes and is not intended to limit the scope of the present disclosure. The wavelength spectra of the four single holograms and the overall wavelength spectrum of the multiplexed reflective grating are also for illustrative purposes, and are not intended to limit the scope of the present disclosure.

In the disclosed embodiments, for illustrative purposes, the angularly selective dimming elements are proposed here for waveguide-based AR devices or MR device. However, the angularly selective dimming elements may also be effective for the AR displays or MR displays with other diffractive type optical combiners, such as a holographic image combiner used in retina projection displays, a holographic combiner used as an eye-tracking combiner, a liquid crystal type optical combiner used as an eye-tracking combiner. The holographic combiner may be a holographic optical element (HOE) that superimposes a virtual image on a real-world scene. In some embodiments, the HOE may be a diffraction grating prepared by the holography techniques. The appropriate intensities of both a real-world object and a diffracted image may be seen simultaneously. The angularly selective dimming element may be disposed at a side of the HOE combiner facing the real world, the real-world light may be transmitted through the angularly selective dimming element towards the HOE combiner. Thus, the undesired rainbow caused by the HOE combiner may be dimmed while the brightness of the desired see-through views may be only slightly reduced. For example, as FIG. 11A shows, the holographic dimming element 1100 may be disposed at a side of a diffractive type holographic combiner 1050 facing the real world, where the undesired rainbow caused by the holographic combiner 1050 may be dimmed via reflection, while the brightness of the desired see-through views may be only slightly reduced.

Figure 12:
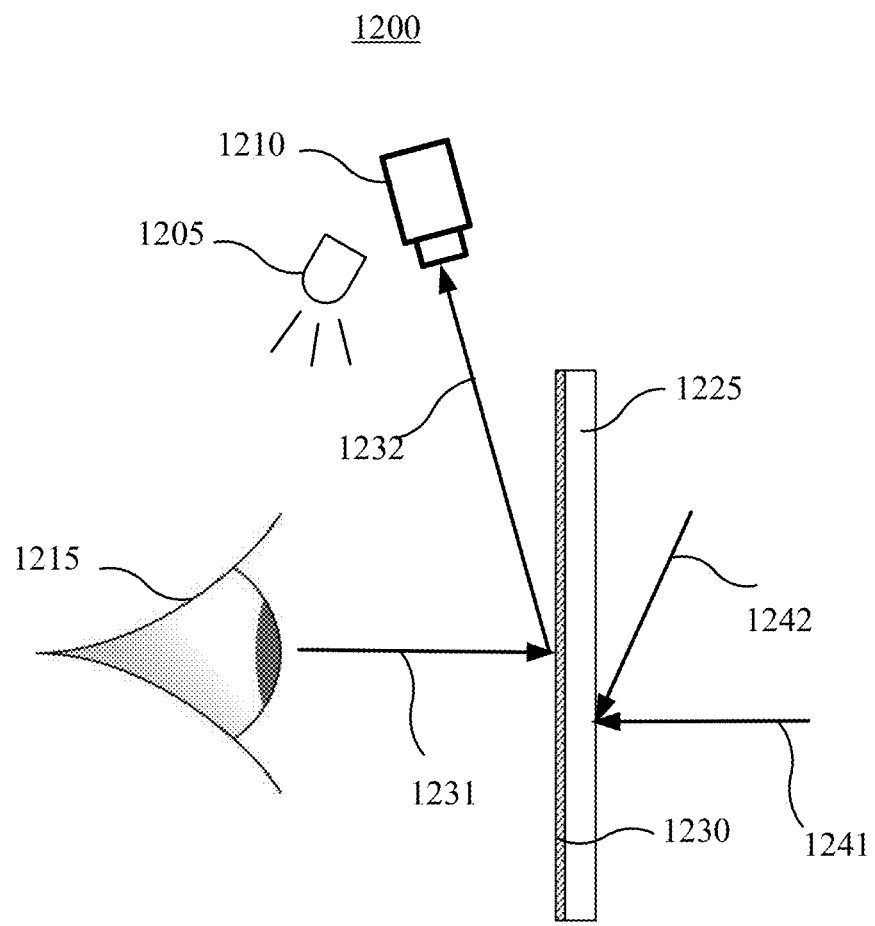
FIG. 12 illustrates a schematic diagram of an eye-tracking system including an angularly selective dimming element, according to an embodiment of the present disclosure.

In some embodiments, the angularly selective dimming element in accordance with an embodiment of the present disclosure may be used in AR or MR displays with a diffractive type eye-tracking combiner. FIG. 12 illustrates a schematic diagram of an eye-tracking system 1200 including an angularly selective dimming element 1225, according to an embodiment of the present disclosure. As shown in FIG. 12, a light source 1205 may emit an infrared ("IR") light to illuminate one or two eyes 1215 of a user of the NED. The IR light is not visible to the human eye and, thus, does not distract the user wearing the NED during operation. An optical sensor 1210, such as a camera, may be arranged to receive an IR light reflected by the eye 1215 and generate an image of the eye 1215, based on the received IR light. The image of the eye 1215 may be used to extract desired information (e.g., gaze direction, movement direction, psychological state, etc.) of the eye. An eye-tracking combiner 1230 may be arranged facing the eye 1215 and the optical sensor 1210, and an IR light 1231 reflected by the eye 1215 may be diffracted by the eye-tracking combiner 1230 to be a diffracted IR light 1232 towards the optical sensor 1210.

In some embodiments, the light emitted by the light source 1205 may include a narrow spectrum or a relatively broad spectrum, and one or more wavelengths of the light may be in the infrared ("IR") spectrum, i.e., the spectrum of the light source 1205 may be within, overlap, or encompass the IR spectrum. In some embodiments, the light source 1205 may emit light in the near infrared ("NIR") band (about 750 nm to 1250 nm), or some other portion of the electromagnetic spectrum. The IR light may be reflected by a pupil area, of the eye 1215, the entire eye 1215 of the user, an area near, such as above, below, left to, or right to, the eye 1215 of the user, or an area including the eye 1215 and the area near the eye 1215.

The optical sensor 1210 may be sensible to light having a wavelength within a spectrum that includes IR spectrum. In some embodiments, the optical sensor 1210 may be sensible to IR light but not to visible light. In some embodiments, the optical sensor 1210 may include a camera, such as a charge-coupled device ("CCD") camera, a complementary metal-oxide-semiconductor ("CMOS") sensor, an N-type metal-oxide-semiconductor ("NMOS") sensor, a pixelated camera, or any other suitable cameras. Further, the optical sensor 1210 may include a processor configured to process the infrared light, to generate an image of the eye 1215, and/or to analyze the image of the eye 1215 to obtain information that may be used for eye-tracking and other subsequent operations, such as for determining what information to present to the user or the layout of the presentation of the information, etc. In some embodiments, the optical sensor 1210 may also include a non-transitory computer-readable storage medium (e.g., a computer-readable memory) configured to store data, such as the generated images. In some embodiments, the non-transitory computer-readable storage medium may store codes or instructions that may be executable by the processor to perform various steps of any method disclosed herein. In some embodiments, the processor and the non-transitory computer-readable medium may be provided separately from the optical sensor 1210. For example, the eye-tracking system 1200 may include a controller communicatively connected with the optical sensor 1210 and configured to receive data from the optical sensor 1210. The controller may be configured to analyze the data (e.g., images of the eye 1215) received from the optical sensor 1210 to obtain information for eye-tracking or other purposes.

An angularly selective dimming element 1225 in accordance with an embodiment of the present discourse may be disposed at a side of the eye-tracking combiner 1230 facing the real world. The angularly selective dimming element 1225 may significantly attenuate or completely block an obliquely incident light 1242 having a high incidence angle (e.g., larger than) 60°, and negligibly attenuate or slightly attenuate a substantially normally incident light 1241. Thus, the undesired rainbow caused by the eye-tracking combiner 1230 may be dimmed, while the brightness of the desired see-through views may be only slightly reduced.

It is to be noted that, in some embodiments, the AR device or MR device may include both an image combiner (also referred to as an AR combiner) and an eye-tracking combiner. In some embodiments, the AR combiner may include one or more diffractive elements, then an angularly selective dimming element in accordance with an embodiment of the present discourse may be disposed at a side of the AR combiner facing the real world. The angularly selective dimming element may serve for all diffractive elements in the device, such as the diffractive AR combiner, and the diffractive type eye tracking combiner, etc. In other words, a presence of only one angularly selective dimming element in accordance with an embodiment of the present discourse may be sufficient to suppress the rainbow effect caused by the diffractive structures, and additional angularly selective dimming element may be no longer disposed adjacent to the eye-tracking combiner. In some embodiments, the AR combiner may not include a diffractive element while the eye-tracking combiner may include one or more diffractive elements, then an angularly selective dimming element in accordance with an embodiment of the present discourse may be disposed at a side of the AR combiner facing the real world or at a side of the eye-tracking combiner facing the real world. The light configured to illuminate the eyes for eye-tracking purposes may be not desired to be dimmed, because the light is in the IR range and, thus, is invisible to eyes, which may not cause visible rainbows.

Figure 13:
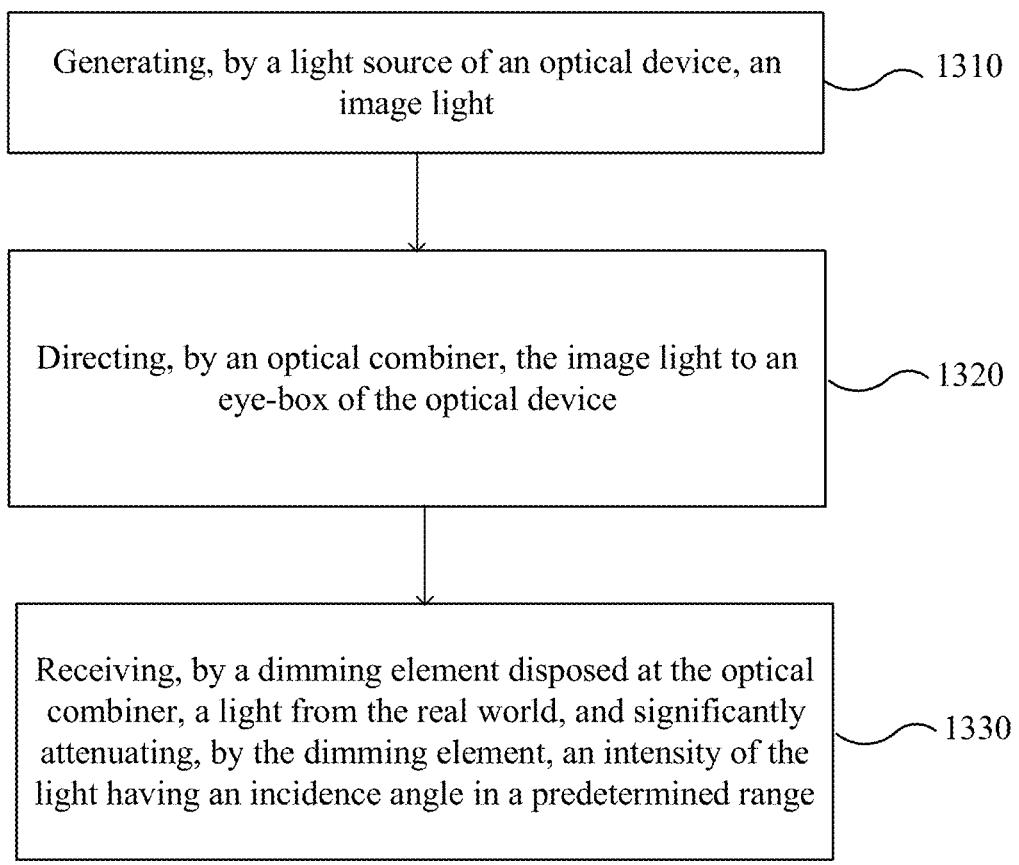
FIG. 13 illustrates a flow chart of a method to suppress a rainbow effect, according to an embodiment of the present disclosure.

The present disclosure may also provide a method for an optical device to suppress a rainbow effect caused by unintended diffraction of a light, for example, a light coming from the real world (i.e., a real-world light). FIG. 13 illustrate a flow chart 1300 of a method for an optical device to suppress a rainbow effect according to an embodiment of the present disclosure. As shown in FIG. 13, the method may include generating, by a light source of an optical device, an image light (S1310). The method may further include directing, by an optical combiner, the image light to an eye-box of the optical device (S1320). The optical combiner may include at least one diffractive element. The optical combiner may have a first side facing the eye-box and an opposing second side facing a real world. The method may further include, receiving, by a dimming element disposed at the second side of the optical combiner, a light from the real world, and significantly attenuating, by the dimming element, an intensity of the light having an incidence angle in a predetermined range (S1330). The dimming element may be a dimming element in accordance with an embodiment of the present disclosure. In some embodiments, the dimming element may include a plurality of louver structures that enhances an attenuation of the light having the incidence angle in the predetermined range as the incidence angle increases. In some embodiments, the dimming element may include a reflective holographic dimming element that enhances an attenuation of the light having the incidence angle in the predetermined range via Bragg diffraction. In some embodiments, the reflective holographic dimming element may include a holographic diffuser that enhances the attenuation of the light having the incidence angle in the predetermined range via diffusion resulted from the Bragg diffraction on a randomized reflective grating. In some embodiments, the reflective holographic dimming element may include a reflective grating that enhances the attenuation of the light having the incidence angle in the predetermined range via reflection resulted from the Bragg diffraction. In some embodiments, the dimming element may be a first dimming element. The method may further include attenuating, by a second dimming element, the light from the real world depending on brightness of the real world. The second dimming element may be a tunable dimming element.

Figure 14:
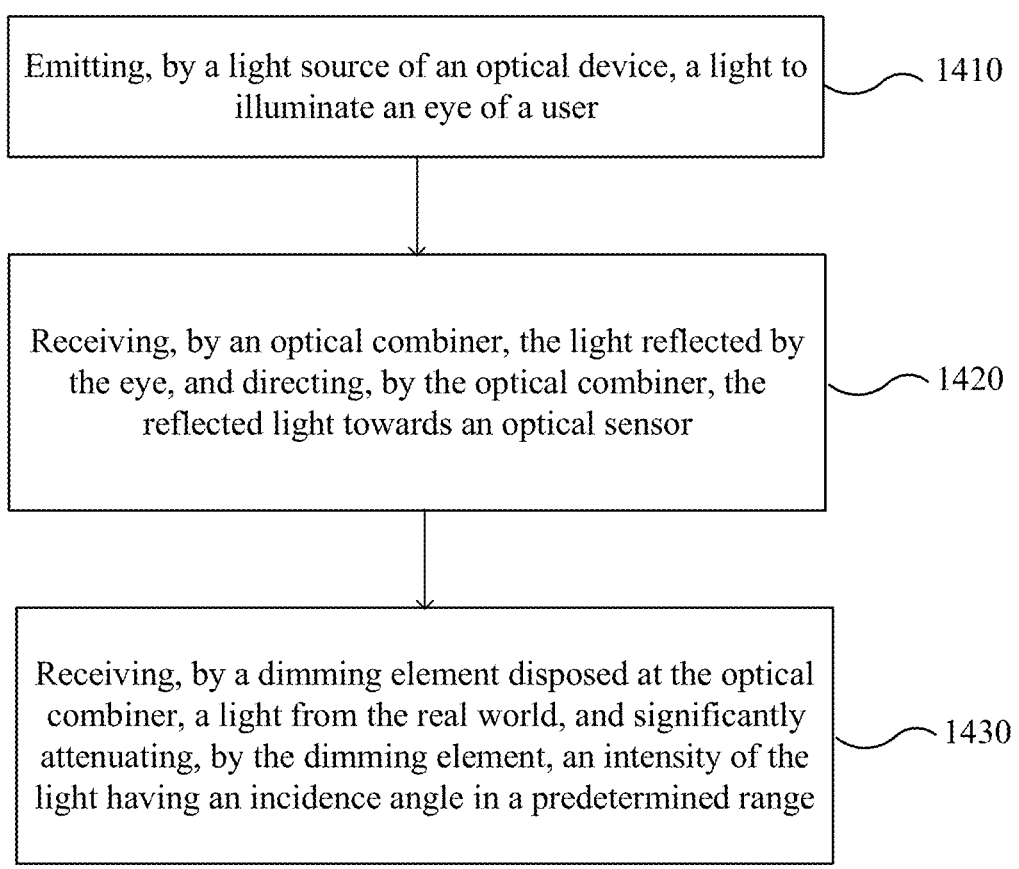
FIG. 14 illustrates a flow chart of a method to suppress a rainbow effect, according to another embodiment of the present disclosure.

FIG. 14 illustrate a flow chart 1400 of a method for an optical device to suppress a rainbow effect according to another embodiment of the present disclosure. As shown in FIG. 14, the method may include emitting, by a light source of an optical device, a light to illuminate an eye of a user (S1410). The method may further include receiving, by an optical combiner, the light reflected by the eye, and directing, by the optical combiner, the reflected light towards an optical sensor (S1420). The optical combiner may include at least one diffractive element. The optical combiner may have a first side facing the eye-box and an opposing second side facing a real world. The method may further include, receiving, by a dimming element disposed at the second side of the optical combiner, a light from the real world, and significantly attenuating, by the dimming element, an intensity of the light having an incidence angle in a predetermined range (S1430). The dimming element may be a dimming element in accordance with an embodiment of the present disclosure. The details of the dimming elements can be referred to the description of the devices, which are not repeated here.

The foregoing description of the embodiments of the disclosure have been presented for the purpose of illustration. It is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the disclosure may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. A device, comprising:
   a frame;
   a display mounted to the frame, the display having an inner side facing an eye-box of the device and an outer side facing a real world environment, the display comprising:
      a tunable dimming element, and a waveguide display assembly located between the tunable dimming element and the eye-box,
      wherein the tunable dimming element is located at an outer side of the waveguide display assembly facing the real world environment, and an inner side of the waveguide display assembly faces the eye-box,
      wherein the tunable dimming element is configured to receive a visible light coming from the real world environment at the outer side of the display, attenuate the visible light depending on a brightness of the visible light, and transmit a first attenuated visible light toward the waveguide display assembly and the eye-box, and
      wherein the waveguide display assembly includes:
         a light source configured to generate an image light;
         an optical combiner configured to direct the image light to the eye-box, the optical combiner including at least one diffractive element, the optical combiner having an inner side facing the eye-box and an outer side facing the real world environment; and
         a passive angularly selective dimming element disposed at the outer side of the optical combiner between the optical combiner and the tunable dimming element, wherein the passive angularly selective dimming element includes a reflective grating configured to attenuate the first attenuated visible light received from the tunable dimming element by diffracting the first attenuated visible light back to the tunable dimming element and the real world environment, and wherein the reflective grating is configured to provide more attenuation to the first attenuated visible light when the first attenuated visible light has an incidence angle that is in the range of about 60° to 90° than when the first attenuated visible light is a substantially normally incident light.

2. The device of claim 1, wherein the reflective grating is a holographic reflective grating.

3. The device of claim 1, wherein the reflective grating is a randomized reflective grating configured to attenuate the visible light via backward diffusion.

4. The device of claim 1, wherein:
   the reflective grating includes a hologram recorded at a film of holographic materials.

5. The device of claim 4, wherein the reflective grating includes multiple holograms superimposed in a same volume region of the film of holographic materials.

6. The device of claim 4, wherein the holographic materials are isotropic.

7. The device of claim 1, wherein the optical combiner includes a waveguide including an in-coupling element configured to couple the image light into the waveguide to propagate within the waveguide through total internal reflection, and an out-coupling element configured to decouple the image light out of the waveguide towards the eye-box, the in-coupling element or the out-coupling element including the at least one diffractive element.

8. The device of claim 1, wherein the optical combiner includes a holographic combiner including the at least one diffractive element.

* * * * *